United States Patent
Sun et al.

(10) Patent No.: US 12,470,321 B2
(45) Date of Patent: Nov. 11, 2025

(54) BIT BLOCK SENDING METHOD AND APPARATUS

(71) Applicant: Huawei Technologies Co., Ltd., Shenzhen (CN)

(72) Inventors: Desheng Sun, Shenzhen (CN); Li Ding, Shenzhen (CN); Chunsheng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/161,605

(22) Filed: Jan. 30, 2023

(65) Prior Publication Data

US 2023/0171024 A1 Jun. 1, 2023

Related U.S. Application Data

(63) Continuation of application No. PCT/CN2021/109937, filed on Jul. 31, 2021.

(30) Foreign Application Priority Data

Jul. 31, 2020 (CN) .......................... 202010763632.9

(51) Int. Cl.
*H04L 1/00* (2006.01)
*H04L 1/1867* (2023.01)

(52) U.S. Cl.
CPC .......... *H04L 1/0041* (2013.01); *H04L 1/0045* (2013.01); *H04L 1/1874* (2013.01)

(58) Field of Classification Search
None
See application file for complete search history.

(56) References Cited

U.S. PATENT DOCUMENTS

| 6,088,337 A | 7/2000 | Eastmond et al. |
| 6,826,684 B1 * | 11/2004 | Fink ..................... H04L 61/2539 726/13 |
| 8,484,370 B1 * | 7/2013 | Coffee .................. H04L 69/164 709/228 |
| 2006/0092871 A1 * | 5/2006 | Nishibayashi .......... H04L 1/188 370/477 |

(Continued)

FOREIGN PATENT DOCUMENTS

| CN | 1735002 A | 2/2006 |
| CN | 101124762 A | 2/2008 |

(Continued)

OTHER PUBLICATIONS 802.3br-2016—IEEE Standard for Ethernet "Amendment 5: Specification and Management Parameters for Interspersing Express Traffic," Jun. 30, 2016, 58 pages.

(Continued)

*Primary Examiner* — Mujtaba M Chaudry
(74) *Attorney, Agent, or Firm* — Conley Rose, P.C.

(57) ABSTRACT

A bit block sending method includes generating at least one first bit block, where the at least one first bit block is used to feed back whether at least one first packet is correctly received, the at least one first bit block further includes a first sequence field, and the first sequence field is used to carry first sequence information of the at least one first packet, and sending the at least one first bit block.

27 Claims, 30 Drawing Sheets

(56) References Cited

U.S. PATENT DOCUMENTS

| | | | |
|---|---|---|---|
| 2008/0082891 A1* | 4/2008 | Park | H04L 1/1621 |
| | | | 714/749 |
| 2009/0232053 A1 | 9/2009 | Taki et al. | |
| 2017/0097867 A1 | 4/2017 | Glaser et al. | |
| 2018/0302194 A1* | 10/2018 | Wang | H04W 52/0216 |
| 2018/0352556 A1* | 12/2018 | Loehr | H04L 43/16 |
| 2021/0091888 A1* | 3/2021 | Lin | H04L 1/1614 |

FOREIGN PATENT DOCUMENTS

| | | |
|---|---|---|
| CN | 104471891 A | 3/2015 |
| WO | 2014014577 A1 | 1/2014 |
| WO | 2017150042 A1 | 9/2017 |

OTHER PUBLICATIONS

Request for Comments: 5681, M. Allman et al, "TCP Congestion Control," Network Working Group, Sep. 2009, 18 pages.

Request for Comments: 2018, M. Mathis et al, "TCP Selective Acknowledgment Options," Network Working Group, Oct. 1996, 12 pages.

* cited by examiner

| 8 octets with T/RXC | | | | | | | | D0 | D1 | D2 | D3 | D4 | D5 | D6 | D7 | 2.5/5 10GE | 40GE 100GE | CPRI |
|---|---|---|---|---|---|---|---|---|---|---|---|---|---|---|---|---|---|---|
| D0 | D1 | D2 | D3 | D4 | D5 | D6 | D7 | D0 | D1 | D2 | D3 | D4 | D5 | D6 | D7 | Valid | Valid | Valid |
| C0 | C1 | C2 | C3 | C4 | C5 | C6 | C7 | 0x1E | C0 | C1 | C2 | C3 | C4 | C5 | C6 | C7 | Valid | Valid | Invalid |
| C0 | C1 | C2 | C3 | O4 | D5 | D6 | D7 | 0x2D | C0 | C1 | C2 | O4 | D5 | D6 | D7 | Valid | Invalid | Invalid |
| C0 | C1 | C2 | C3 | S4 | D5 | D6 | D7 | 0x33 | C0 | C1 | C2 | C3 | D5 | D6 | D7 | Valid | Invalid | Invalid |
| O0 | D1 | D2 | D3 | O4 | D5 | D6 | D7 | 0x66 | D1 | D2 | D3 | O0 | O4 | D5 | D6 | D7 | Valid | Invalid | Invalid |
| S0 | D1 | D2 | D3 | D4 | D5 | D6 | D7 | 0x55 | D1 | D2 | D3 | O0 | D4 | D5 | D6 | D7 | Valid | Valid | Valid |
| O0 | D1 | D2 | D3 | C4 | C5 | C6 | C7 | 0x78 | D1 | D2 | D3 | O0 | C4 | C5 | C6 | C7 | Valid | Valid | Invalid |
| T0 | C1 | C2 | C3 | C4 | C5 | C6 | C7 | 0x87 | C1 | C2 | C3 | | | | | | Valid | Valid | Invalid |
| D0 | T1 | C2 | C3 | C4 | C5 | C6 | C7 | 0x99 | D0 | C2 | C3 | C4 | C5 | C6 | C7 | Valid | Valid | Invalid |
| D0 | D1 | T2 | C3 | C4 | C5 | C6 | C7 | 0xAA | D0 | D1 | C3 | C4 | C5 | C6 | C7 | Valid | Valid | Invalid |
| D0 | D1 | D2 | T3 | C4 | C5 | C6 | C7 | 0xB4 | D0 | D1 | D2 | C4 | C5 | C6 | C7 | Valid | Valid | Invalid |
| D0 | D1 | D2 | D3 | T4 | C5 | C6 | C7 | 0xCC | D0 | D1 | D2 | D3 | C5 | C6 | C7 | Valid | Valid | Invalid |
| D0 | D1 | D2 | D3 | D4 | T5 | C6 | C7 | 0xD2 | D0 | D1 | D2 | D3 | D4 | C6 | C7 | Valid | Valid | Invalid |
| D0 | D1 | D2 | D3 | D4 | D5 | T6 | C7 | 0xE1 | D0 | D1 | D2 | D3 | D4 | D5 | C7 | Valid | Valid | Invalid |
| D0 | D1 | D2 | D3 | D4 | D5 | D6 | T7 | 0xFF | D0 | D1 | D2 | D3 | D4 | D5 | D6 | Valid | Valid | Valid |
| | | | | | | | | Reserved | R | R | R | R | R | R | R | | | |

H: Synchronization header
Type: Type
Control: Control
Payload flit: Payload flit
CRC: Cyclic redundancy check MAC: Media access control
RS: Reconciliation sublayer
PCS: Physical coding sublayer
PMA: Physical media attachment sublayer
PMD: Physical media dependent layer

BIT BLOCK SENDING METHOD AND APPARATUS

CROSS-REFERENCE TO RELATED APPLICATIONS

This is a continuation of International Patent Application No. PCT/CN2021/109937 filed on Jul. 31, 2021, which claims priority to Chinese Patent Application No. 202010763632.9 filed on Jul. 31, 2020. The disclosures of the aforementioned applications are hereby incorporated by reference in their entireties.

TECHNICAL FIELD

This application relates to the field of communications technologies, and in particular, to a bit block sending method and an apparatus.

BACKGROUND

To ensure that a packet can be accurately and correctly received, a transmit end backs up a packet in a replay buffer each time the transmit end sends the packet. Only after the transmit end receives an acknowledgment (ACK) packet from a receive end, the transmit end determines that the packet is correctly received, and deletes the backup of the packet from the replay buffer. If the transmit end receives a negative acknowledgment (NACK) packet from the receive end, the transmit end extracts the packet from the replay buffer, and resends (or retransmits) the packet.

Generally, a typical length of a packet may be 256 bytes, and a length of the packet may be even larger. Therefore, a problem such as packet blocking may be caused, and consequently, the transmit end cannot receive, in a timely manner, an ACK packet or a NACK packet fed back by the receive end.

SUMMARY

This application provides a bit block sending method and an apparatus, to ensure that a communication apparatus feeds back, in a timely manner, whether a packet is correctly received, in other words, ensure that the communication apparatus sends, in a timely manner, an ACK or a NACK that is fed back.

According to a first aspect, an embodiment of this application provides a bit block sending method. The method includes generating at least one first bit block, where the at least one first bit block is used to feed back whether at least one first packet is correctly received, the at least one first bit block includes a first sequence field, and the first sequence field is used to carry first sequence information of the at least one first packet; and sending the at least one first bit block.

In this embodiment of this application, a communication apparatus feeds back, to a peer end in a form of the first bit block, whether a packet is correctly received such that a possibility that the at least one first bit block is sent in a timely manner is higher, and a feedback manner is more flexible. Because the probability that the at least one first bit block is sent in a timely manner is increased, a delay in obtaining the first bit block by the peer end is reduced, a delay of service flow completion time (FCT) is reduced, and network utilization is improved. In addition, a length of the at least one first bit block is less than or equal to a length of the packet whenever possible. For example, the length of the at least one first bit block may be 64 bits, 128 bits, or 256 bits. Therefore, a transmission delay of the first bit block is reduced as much as possible, so that another packet is prevented from being blocked because transmission time of the at least one first bit block is excessively long.

In a possible implementation, the first bit block is a non-packet bit block.

In this embodiment of this application, the first bit block is a non-packet bit block, and the non-packet bit block includes a non-packet start bit block. For example, a value carried in a preset field in the non-packet start bit block is different from a value carried in a preset field in a packet start bit block. Therefore, the non-packet start bit block and the packet start bit block can be distinguished. Alternatively, when the at least one first bit block includes at least one O bit block, functions of the O bit block and another O bit block can also be distinguished by using different values carried in a preset field in the O bit block. In addition, the at least one first bit block can be further inserted into a bitstream of a second packet currently being sent by the communication apparatus, so that the at least one first bit block can be prevented from being sent only after sending of the second packet is completed, thereby reducing a waiting delay of the at least one first bit block and the delay of the FCT and improving network utilization.

In a possible implementation, the first bit block is a packet bit block.

In this embodiment of this application, the first bit block is a packet bit block. For example, when the communication apparatus needs to feed back whether a corresponding packet (for example, the first packet) is correctly received, the communication apparatus just needs to send a second packet. In this case, the communication apparatus may feed back, in the second packet, whether the corresponding packet is correctly received.

In a possible implementation, the packet bit block is at least one of a packet start bit block, a data bit block corresponding to the packet start bit block, an end bit block corresponding to the packet start bit block, a packet end bit block, a start bit block corresponding to the packet end bit block, and a data bit block corresponding to the packet end bit block.

In this embodiment of this application, not only the packet start bit block and the non-packet start bit block can be distinguished by using a preset field, but also the packet end bit block corresponding to the packet start bit block and a non-packet end bit block corresponding to the non-packet start bit block can be distinguished by using the preset field. Alternatively, the packet data bit block corresponding to the packet start bit block and a non-packet data bit block corresponding to the non-packet start bit block can be distinguished by using a preset field.

In a possible implementation, the method further includes sending a second packet. The second packet includes a packet bit block.

In this embodiment of this application, the second packet may include a packet start bit block and a data bit block corresponding to the packet start bit block; or the second packet includes a packet start bit block, a data bit block corresponding to the packet start bit block, and an end bit block corresponding to the packet start bit block.

In a possible implementation, sending the at least one first bit block includes sending the at least one first bit block after the packet start bit block of the second packet is sent and before sending of the second packet is completed.

In this embodiment of this application, because the first bit block is a non-packet bit block, and the second packet includes the packet bit block, even if the first bit block is inserted into the second packet, the peer end can distinguish the first bit block from the second packet. Therefore, the peer end can obtain, based on the at least one first bit block, information fed back by the communication apparatus. In addition, inserting the first bit block into the second packet for sending further reduces the waiting delay of the at least one first bit block and the delay of the FCT and improves network utilization.

In a possible implementation, the at least one first bit block includes a non-packet start bit block, and a preset field in the non-packet start bit block carries a first value.

In a possible implementation, a preset field in the packet start bit block carries a third value.

In this embodiment of this application, the non-packet start bit block and the packet start bit block can be distinguished by using the preset field such that the at least one first bit block can be inserted into the second packet. In addition, a non-packet end bit block corresponding to the non-packet start bit block and a packet end bit block corresponding to the packet start bit block can be further distinguished by distinguishing the non-packet start bit block and the packet start bit block; or a non-packet data bit block corresponding to the non-packet start bit block and a packet data bit block corresponding to the packet start bit block can be further distinguished, so that feasibility of inserting the at least one first bit block into the second packet is higher.

In a possible implementation, the at least one first bit block includes at least one sequence (sequence ordered set, O) bit block, and a preset field in each of the at least one O bit block carries a second value.

In this embodiment of this application, the communication apparatus may feed back, by using the at least one O bit block, whether the packet is correctly received. Optionally, the at least one O bit block may be further inserted into the bitstream of the second packet being sent by the communication apparatus. For example, the at least one O bit block may include one O bit block, two O bit blocks, or three O bit blocks. This is not limited in this embodiment of this application.

In a possible implementation, the at least one first bit block further includes a first type field, the first type field is used to indicate a type of the at least one first bit block, and the type of the at least one first bit block includes an acknowledgment ACK bit block or a negative acknowledgment NACK bit block.

In a possible implementation, the at least one first bit block further includes at least one data bit block corresponding to the non-packet start bit block, an end bit block corresponding to the non-packet start bit block, or at least one data bit block corresponding to the non-packet start bit block and an end bit block corresponding to the non-packet start bit block.

In this embodiment of this application, the data bit block corresponding to the non-packet start bit block may be further referred to as a non-packet data bit block, and the end bit block corresponding to the non-packet start bit block may be further referred to as a non-packet end bit block.

In a possible implementation, when the at least one first bit block includes the non-packet start bit block and the non-packet end bit block, sending the at least one first bit block includes sequentially sending the non-packet start bit block and the non-packet end bit block; or sequentially sending the non-packet end bit block and the non-packet start bit block.

In a possible implementation, the non-packet bit block may further include at least one of a non-packet end bit block, a data bit block corresponding to the non-packet end bit block, and a start bit block corresponding to the non-packet end bit block.

In this embodiment of this application, the data bit block corresponding to the non-packet end bit block may be further referred to as a non-packet data bit block, and the start bit block corresponding to the non-packet end bit block may be further referred to as a non-packet start bit block.

In a possible implementation, the at least one first bit block further includes a cyclic redundancy check (CRC) field.

In this embodiment of this application, the CRC field may be used to carry CRC information.

In a possible implementation, the first bit block is a P1 B/P2 B bit block, P1 represents a payload bit quantity of the first bit block, P2 represents a total bit quantity of the first bit block, and P2-P1 represents a synchronization header bit quantity of the first bit block.

In a possible implementation, a value of P1 is any one of the following: 64, 128, 256, and 512, and a value of P2-P1 is any one of the following: 1, 2, and 3.

For example, the first bit block may be a 64B/66B bit block, a 128B/129B bit block, a 128B/130B bit block, a 128B/131B bit block, a 256B/257B bit block, a 256B/258B bit block, a 256B/259B bit block, a 512B/513B bit block, a 512B/514B bit block, a 512B/515B bit block, or the like.

In a possible implementation, the packet start bit block includes a second sequence field, and the second sequence field is used to carry second sequence information.

In a possible implementation, the packet start bit block further includes a second type field, and when the second type field carries a fourth value, the second type field is used to indicate that the second sequence information is a sequence number of the second packet.

In this embodiment of this application, a specific meaning of the second sequence information may be determined based on a value of the second type field. For example, when the second type field carries the fourth value, the second type field is used to indicate that the second sequence information is the sequence number of the second packet; or when the second type field carries a fifth value, the second sequence field may be used to indicate that the second sequence information is a sequence number that is of a correctly received first packet and that is fed back.

The method provided in the first aspect of this application may be applied to the communication apparatus, and the communication apparatus may include a receive end.

According to a second aspect, an embodiment of this application provides a bit block receiving method. The method includes receiving at least one first bit block, where the at least one first bit block is used to feed back whether at least one first packet is correctly received, the at least one first bit block includes a first sequence field, and the first sequence field is used to carry first sequence information of the at least one first packet; and determining, based on the at least one first bit block, whether to retransmit the at least one first packet corresponding to the first sequence information.

In a possible implementation, the at least one first bit block further includes a CRC field, and the CRC field is used to carry CRC information.

In this embodiment of this application, the CRC information may be used to check the first sequence information or the like.

In a possible implementation, determining, based on the at least one first bit block, whether to retransmit the at least one first packet corresponding to the first sequence information includes that when the CRC information in the at least one first bit block is successfully checked, determining, based on the at least one first bit block, whether to retransmit the at least one first packet corresponding to the first sequence information.

In a possible implementation, the method further includes that when it is determined, based on the at least one first bit block, to retransmit the at least one first packet corresponding to the first sequence information, retransmitting the at least one incorrectly received first packet corresponding to the first sequence information.

In a possible implementation, determining, based on the at least one first bit block, whether to retransmit the at least one first packet corresponding to the first sequence information includes obtaining a value carried in a preset field in the at least one first bit block; and when the preset field carries a first value or a third value, determining, based on a first type field in the at least one first bit block, whether to retransmit the first packet corresponding to the first sequence information.

In this embodiment of this application, a communication apparatus may further obtain a block type field of the at least one first bit block, and determine, based on the type field, the value carried in the preset field, and the first type field, whether to retransmit the first packet corresponding to the first sequence information. For example, if the block type field of the at least one first bit block is 0x4B, and the preset field carries 0x06, it indicates that the at least one obtained first bit block is an O bit block, and a function of the O bit block is to feed back retransmission control information, and in this case, the communication apparatus may determine, based on a first type field in the O bit block, whether to retransmit the first packet corresponding to the first sequence information. For example, if the block type field of the at least one first bit block is 0x78, and the preset field carries 0xF5, the communication apparatus may determine, based on a first type field in the non-packet start bit block, whether to retransmit the first packet corresponding to the first sequence information.

In this embodiment of this application, for descriptions of the first bit block, the first sequence field, the first type field, a packet bit block, a non-packet bit block, or the like, refer to the descriptions in the first aspect. Details are not described herein again.

The method provided in the second aspect of this application may be applied to the communication apparatus, and the communication apparatus may include a transmit end.

For beneficial effects of the second aspect, refer to beneficial effects of the first aspect. Details are not described herein again.

According to a third aspect, this application provides a communication apparatus, configured to perform the method in any one of the first aspect and the possible implementations of the first aspect. The communication apparatus includes corresponding units for performing the method in any one of the first aspect and the possible implementations of the first aspect.

For example, the communication apparatus may include a transceiver unit and a processing unit. For example, the processing unit is configured to generate at least one first bit block, and the transceiver unit is configured to send the at least one first bit block. For another example, the transceiver unit is configured to send a second packet. For another example, the transceiver unit is configured to receive a first packet.

According to a fourth aspect, this application provides a communication apparatus, configured to perform the method in any one of the second aspect and the possible implementations of the second aspect. The communication apparatus includes corresponding units for performing the method in any one of the second aspect and the possible implementations of the second aspect.

For example, the communication apparatus may include a transceiver unit and a processing unit. For example, the transceiver unit is configured to receive at least one first bit block, and the processing unit is configured to determine, based on the at least one first bit block, whether to retransmit at least one first packet corresponding to first sequence information. For another example, the transceiver unit is configured to send a first packet. For another example, the transceiver unit is configured to receive a second packet. For another example, the processing unit is configured to check CRC information in the at least one first bit block.

According to a fifth aspect, this application provides a communication apparatus. The communication apparatus includes a processor, and the processor may be configured to perform the method in any one of the first aspect and the possible implementations of the first aspect.

In this embodiment of this application, in a process of performing the foregoing method, a process of sending a packet, receiving a packet, or sending at least one first bit block (collectively referred to as information below) in the foregoing method may be understood as a process of outputting information by the processor and a process of receiving input information by the processor. When outputting the information, the processor outputs the information to a transceiver such that the transceiver transmits the information. After the information is output by the processor, other processing may further need to be performed on the information before the information arrives at the transceiver. Similarly, when the processor receives the input information, the transceiver receives the information, and inputs the information into the processor. Still further, after the transceiver receives the information, other processing may be performed on the information before the information is input into the processor.

Based on the foregoing principle, for example, sending at least one first bit block may be understood as outputting the at least one first bit block by the processor. For another example, sending a second packet may be understood as outputting the second packet by the processor.

Operations, for example, sending and/or receiving operations, related to the processor may be generally understood as outputting, receiving, and inputting operations of the processor unless specially noted or if the operations contradict actual functions or internal logic of the operations in related descriptions.

In an implementation process, the processor may be a processor specially configured to perform these methods, or a processor, for example, a general-purpose processor, configured to execute computer instructions in a memory to perform these methods. For example, the processor may be further configured to execute a program stored in the memory, and when the program is executed, the communication apparatus is enabled to perform the method in any one of the first aspect and the possible implementations of the first aspect.

In a possible implementation, the memory is located outside the communication apparatus.

In a possible implementation, the memory is located inside the communication apparatus.

In this embodiment of this application, the processor and the memory may be further integrated into one component, in other words, the processor and the memory may be integrated together.

In a possible implementation, the communication apparatus further includes the transceiver, and the transceiver is configured to receive a packet, send a packet, send at least one first bit block, or the like. For example, the processor is configured to generate the at least one first bit block, and the transceiver is configured to send the at least one first bit block. For another example, the transceiver is configured to send a second packet. For another example, the transceiver is configured to receive a first packet.

According to a sixth aspect, this application provides a communication apparatus. The communication apparatus includes a processor, and the processor may be configured to perform the method in any one of the second aspect and the possible implementations of the second aspect.

In this embodiment of this application, for specific descriptions of the processor, refer to the foregoing descriptions in the fifth aspect. Details are not described herein again. For example, receiving at least one first bit block may be understood as receiving the at least one input first bit block by the processor. For another example, sending a first packet may be understood as outputting the first packet by the processor.

In an implementation process, the processor may be a processor specially configured to perform these methods, or a processor, for example, a general-purpose processor, configured to execute computer instructions in a memory to perform these methods. For example, the processor may be further configured to execute a program stored in the memory, and when the program is executed, the communication apparatus is enabled to perform the method in any one of the second aspect and the possible implementations of the second aspect.

In a possible implementation, the memory is located outside the communication apparatus.

In a possible implementation, the memory is located inside the communication apparatus.

In a possible implementation, the memory and the processor may be integrated together.

In a possible implementation, the communication apparatus further includes a transceiver, and the transceiver is configured to receive a packet, send a packet, or the like.

For example, the transceiver is configured to receive at least one first bit block, and the processor is configured to determine, based on the at least one first bit block, whether to retransmit at least one first packet corresponding to first sequence information. For another example, the transceiver is configured to send a first packet. For another example, the transceiver is configured to receive a second packet. For another example, the processor is configured to check CRC information in the at least one first bit block.

According to a seventh aspect, this application provides a communication apparatus. The communication apparatus includes a logic circuit and an interface, the logic circuit may be configured to generate at least one first bit block, and the interface may be configured to output the at least one first bit block.

In a possible implementation, the interface may be further configured to input a first packet; and/or the interface may be further configured to output a second packet.

It may be understood that for descriptions of the first bit block, a first sequence field, a first type field, or the like, refer to the descriptions in the first aspect. Details are not described herein again.

According to an eighth aspect, this application provides a communication apparatus. The communication apparatus includes a logic circuit and an interface, the interface is configured to input at least one first bit block, and the logic circuit is configured to determine, based on the at least one first bit block, whether to retransmit at least one first packet.

In a possible implementation, the logic circuit may be further configured to check CRC information in the at least one first bit block.

In a possible implementation, the interface may be further configured to output a first packet and/or input a second packet.

In a possible implementation, the interface may be further configured to output at least one incorrectly received first packet.

It may be understood that for descriptions of the first bit block, a first sequence field, a first type field, or the like, refer to the descriptions in the first aspect. Details are not described herein again.

According to a ninth aspect, this application provides a computer-readable storage medium. The computer-readable storage medium is configured to store a computer program, and when the computer program is run on a computer, the method in any one of the first aspect and the possible implementations of the first aspect is performed.

According to a tenth aspect, this application provides a computer-readable storage medium. The computer-readable storage medium is configured to store a computer program, and when the computer program is run on a computer, the method in any one of the second aspect and the possible implementations of the second aspect is performed.

According to an eleventh aspect, this application provides a computer program product. The computer program product includes a computer program or computer code, and when the computer program product is run on a computer, the method in any one of the first aspect and the possible implementations of the first aspect is performed.

According to a twelfth aspect, this application provides a computer program product. The computer program product includes a computer program or computer code, and when the computer program product is run on a computer, the method in any one of the second aspect and the possible implementations of the second aspect is performed.

According to a thirteenth aspect, this application provides a computer program. When the computer program is run on a computer, the method in any one of the first aspect and the possible implementations of the first aspect is performed.

According to a fourteenth aspect, this application provides a computer program. When the computer program is run on a computer, the method in any one of the second aspect and the possible implementations of the second aspect is performed.

According to a fifteenth aspect, this application provides a communication system. The communication system includes a transmit end and a receive end, the receive end may be configured to perform the method in any one of the first aspect and the possible implementations of the first aspect, and the transmit end may be configured to perform the method in any one of the second aspect and the possible implementations of the second aspect.

BRIEF DESCRIPTION OF DRAWINGS

FIG. 3A is a schematic diagram of a format of a bit block according to an embodiment of this application;

DESCRIPTION OF EMBODIMENTS

Figure 1A:
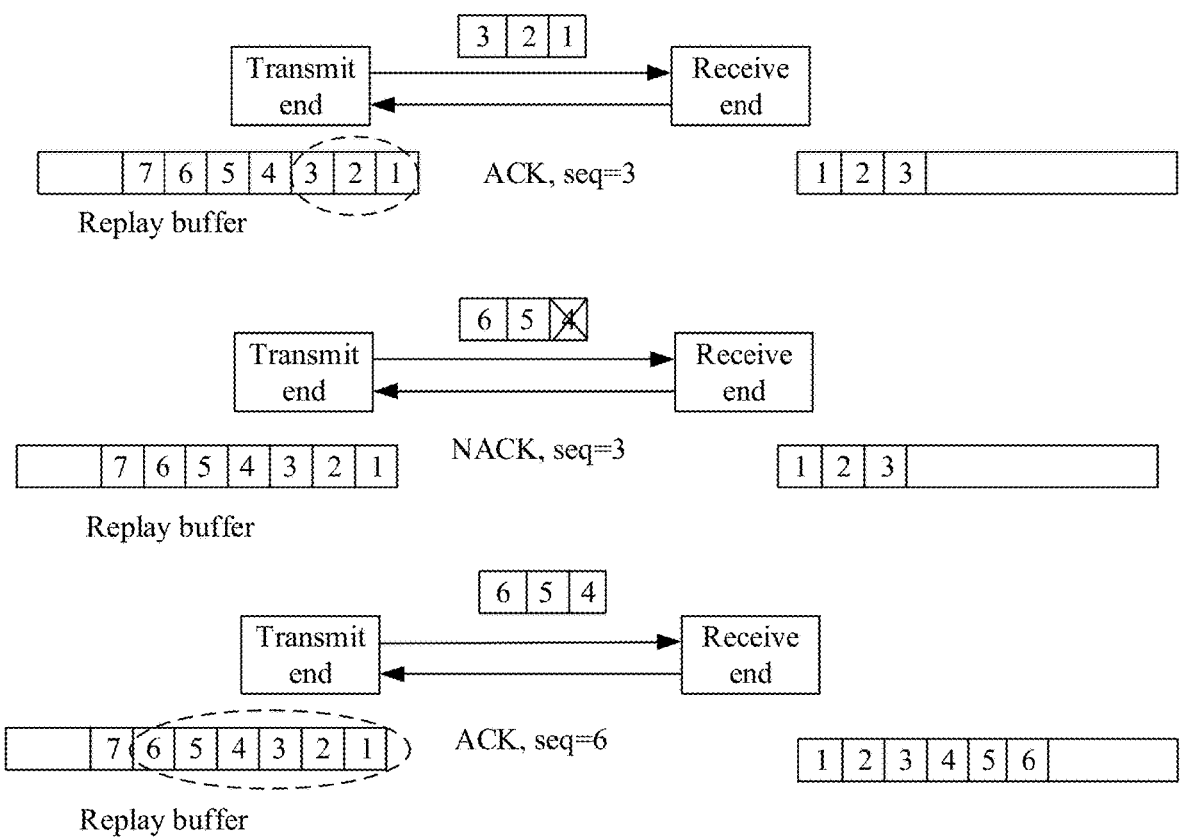
FIG. 1A is a schematic diagram of a retransmission process of a go-back-N protocol according to an embodiment of this application.

To make objectives, technical solutions, and advantages of this application clearer, the following further describes this application in detail with reference to the accompanying drawings.

In the specification, claims, and accompanying drawings of this application, the foregoing terms "first", "second", and so on are intended to distinguish between different objects but do not indicate a particular order. In addition, terms "include", "have", and any other variant thereof are intended to cover non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one" means one or more, "a plurality of" means two or more, "at least two" means two, three, or more, and "and/or" is used to describe an association relationship between associated objects, and indicates that three relationships may exist. For example, "A and/or B" may represent three cases: Only A exists, only B exists, and both A and B exist. A and B may be singular or plural. The character "/" usually indicates an "or" relationship between associated objects. "At least one of the following" or a similar expression thereof means any combination of these items. For example, at least one of a, b, and c may represent a, b, c, "a and b", "a and c", "b and c", or "a, b, and c".

The following describes terms in this application in detail.
1. Go-Back-N Protocol After receiving at least one packet, a communication apparatus may feed back, according to a go-back-N protocol, whether the at least one packet is correctly received. In other words, after receiving the at least one packet, the communication apparatus may feed back, according to the go-back-N protocol, whether the communication apparatus correctly receives the at least one packet. In other words, after receiving the at least one packet, the communication apparatus needs to feed back an ACK packet or a NACK packet to a peer end. However, in this application, the communication apparatus feeds back at least one first bit block to the peer end. For example, a type of the at least one first bit block may be an ACK bit block or a NACK bit block. The ACK bit block indicates that the at least one packet is correctly received, and the NACK bit block indicates that the at least one packet is incorrectly received. In other words, the ACK bit block may be used to notify the peer end of a correctly received packet, and the NACK bit block may be used to notify the peer end of an incorrectly received packet and notify the peer end that the incorrectly received packet needs to be retransmitted. Optionally, the communication apparatus may check, by using CRC information (which may also be referred to as a frame check sequence (FCS)) or the like in the received packet, whether the packet is correctly received.

The communication apparatus in this application may include a transmit end and a receive end, and a packet sent by the transmit end to the receive end is referred to as a first packet, and a packet sent by the receive end to the transmit end is referred to as a second packet. Although packets shown below are classified into first packets and second packets, the first packets shown below may not be a same first packet, and the second packets shown below may not be a same second packet, either.

A specific method for feeding back an ACK bit block or a NACK bit block may be as follows:

Method 1

The receive end may feed back an ACK bit block or a NACK bit block to the transmit end each time the receive end receives one first packet.

Method 2

The receive end may feed back an ACK bit block or a NACK bit block to the transmit end each time the receive end receives a preset quantity of first packets.

FIG. 1A is a schematic diagram in which the receive end feeds back an ACK bit block or a NACK bit block to the transmit end each time the receive end receives three (merely as an example) first packets. As shown in FIG. 1A, the transmit end sends three first packets to the receive end, and sequence numbers of the three first packets are sequentially 1, 2, and 3. The receive end checks, based on CRC information of the three first packets, that the three first packets are correctly received. Therefore, the receive end feeds back an ACK bit block to the transmit end. The ACK bit block includes a sequence number, for example, the sequence number 3, of the last first packet in the three first packets (FIG. 1A shows seq=3 as an example). In this case, the transmit end deletes the first packets of the sequence numbers 1, 2, and 3 from a replay buffer.

Then the transmit end sends three first packets of sequence numbers 4, 5, and 6 to the receive end, and a first packet of the sequence number 4 is incorrectly received. Therefore, the receive end feeds back a NACK bit block to the transmit end. The NACK bit block may include a sequence number, for example, the sequence number 3, of the last packet correctly received by the receive end. In addition, the NACK bit block is used to indicate that a packet of the sequence number 3 and a packet of a sequence number before the sequence number 3 are correctly received but a packet of a sequence number after the sequence number 3 is incorrectly received. In this case, the transmit end retransmits the first packets of the sequence numbers 4, 5, and 6 based on the NACK bit block. Only after receiving an ACK bit block that includes the sequence number 6, the transmit end deletes the first packets of the sequence numbers 4, 5, and 6 from the replay buffer.

It may be understood that the NACK bit block shown in FIG. 1A is shown by using a sequence number of the last packet correctly received by the receive end as an example. However, during specific implementation, the NACK bit block may include a sequence number, for example, the sequence number 4, of the $1^{st}$ packet incorrectly received by the receive end. The NACK bit block is used to indicate that a packet of the sequence number 4 and a packet of a sequence number after the sequence number 4 are incorrectly received. In this case, the transmit end still retransmits the first packets of the sequence numbers 4, 5, and 6 based on the NACK bit block. For ease of description, the following uses the method for feeding back a sequence number in a NACK bit block shown in FIG. 1B as an example to describe the embodiments provided in this application.

Method 3

The receive end may feed back an ACK bit block to the transmit end each time the receive end receives a preset quantity of first packets. However, if the receive end incorrectly receives at least one first packet, the receive end immediately feeds back a NACK bit block to the transmit end. Provided that the receive end incorrectly receives one first packet, the receive end may immediately feed back a NACK bit block to the transmit end.

Figure 1B:
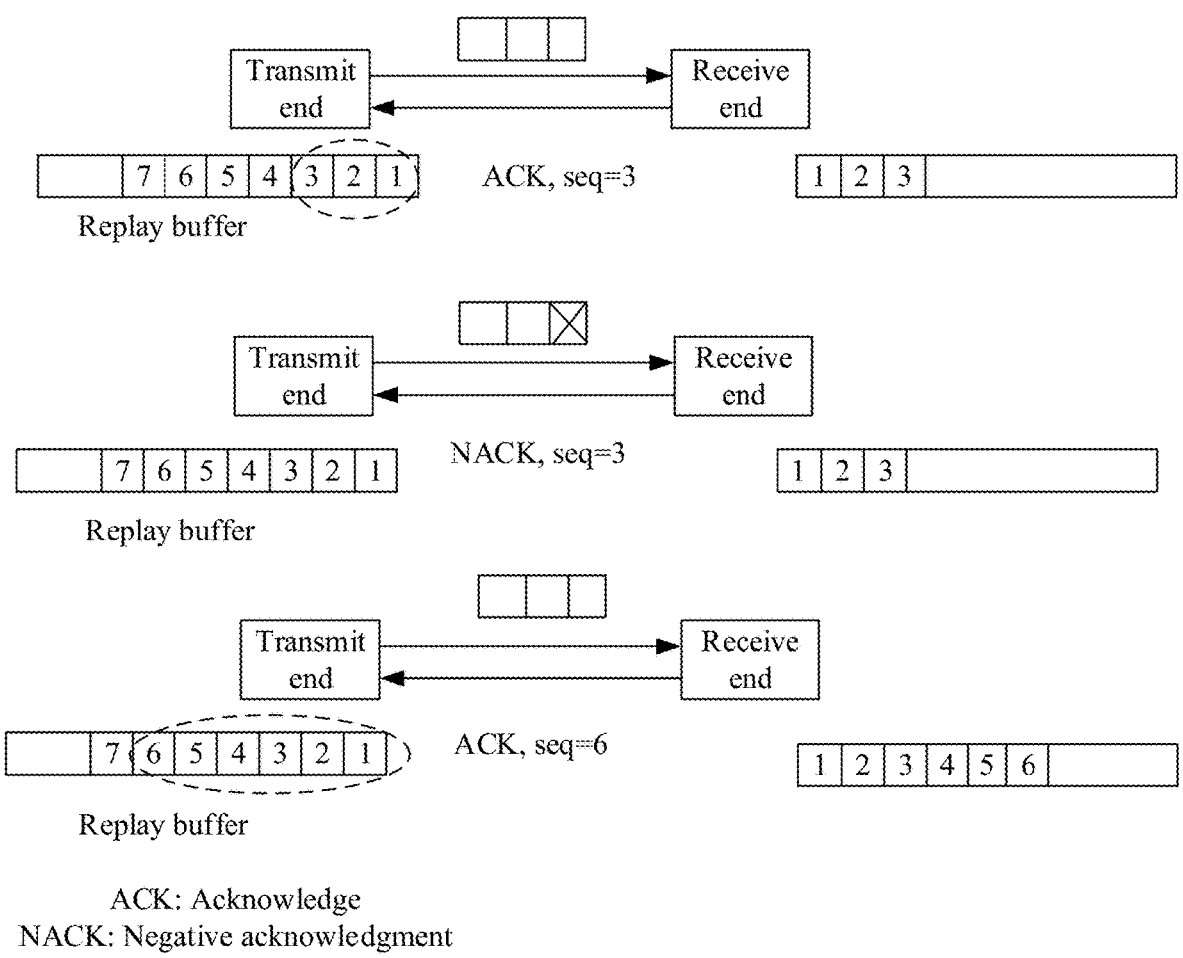
FIG. 1B is a schematic diagram of another retransmission process of a go-back-N protocol according to an embodiment of this application.

A value of the preset quantity in this application includes 2, 3, 4, 5, 1000 (merely as an example), or the like. It may be understood that FIG. 1A is a schematic diagram in which a first packet carries a sequence number in a transmission process. As shown in FIG. 1B, in other embodiments of this application, alternatively, a first packet may not carry a sequence number in a transmission process. In this case, the receive end may still send an ACK bit block or a NACK bit block to the transmit end. For detailed descriptions of FIG. 1B, refer to the following descriptions of FIG. 12D and FIG. 12E. Details are not described herein again.

It may be understood that the foregoing is merely an example. During specific implementation, a quantity of correctly received first packets for which the receive end performs feedback may be alternatively determined depending on whether the receive end can send a NACK bit block or an ACK bit block in a timely manner. If the receive end does not send an ACK (a NACK) bit block in a timely manner when the receive end feeds back the ACK (or NACK) bit block, and the receive end receives a first packet again, the receive end may further feed back a receiving status of the first packet together. It may be understood that the specific method for feeding back an ACK bit block or a NACK bit block shown above is also applicable to the embodiments shown below, and details are not described below.

2. SACK

Figure 1C:
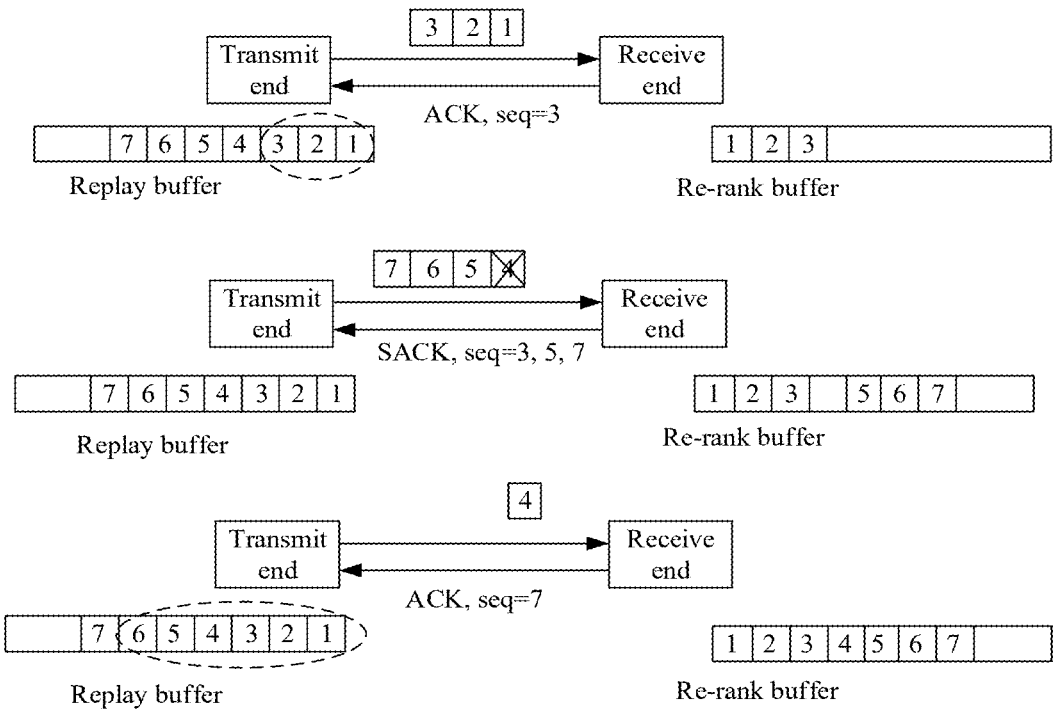
FIG. 1C is a schematic diagram of a selective acknowledge (SACK) retransmission process according to an embodiment of this application.

FIG. 1C is a schematic flowchart in which a receive end feeds back a SACK bit block to a transmit end. As shown in FIG. 1C, the transmit end sends first packets of sequence numbers 4, 5, 6, and 7 to the receive end. A first packet of the sequence number 4 is incorrectly received. In this case, the receive end may feed back at least one first bit block to the transmit end. For example, the at least one first bit block may be further referred to as a SACK bit block. The SACK bit block includes a sequence number 3, the sequence number 5, and the sequence number 7. The sequence number 3 indicates that a first packet of the sequence number 3 and a first packet of a sequence number before the sequence number 3 are correctly received, and first packets of the sequence number 5 to the sequence number 7 are correctly received. In this case, after receiving the SACK bit block, the transmit end may retransmit a first packet of the sequence number 4 to the receive end.

3. Service FCT

Figure 2:
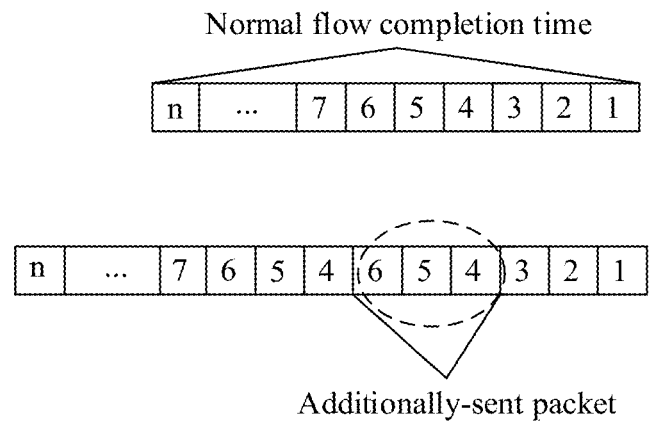
FIG. 2 is a schematic diagram of a process of service flow completion time according to an embodiment of this application.

As shown in FIG. 2, it is assumed that n packets need to be sent on a service flow, sequence numbers of the n packets are 1, 2, 3, . . . , and n, and normal flow completion time is time for transmitting the n packets. However, when a packet of the sequence number 4 is incorrectly received, a receive end feeds back a NACK bit block, and a transmit end retransmits the packet of the sequence number 4. Packets retransmitted by the transmit end in the period may include not only the packet of the sequence number 4 but also packets, for example, a packet of the sequence number 5 and a packet of the sequence number 6, that are sent after the packet of the sequence number 4 before the transmit end receives the NACK bit block. In this case, for the service flow completion time, the receive end receives more packets from a perspective of the receive end, in other words, the service flow completion time is delayed by transmission duration of three packets. In other words, the service flow completion time increases with a delay of the NACK bit block.

4. Packet

A packet (message) is a data unit exchanged and transmitted in a network. For example, the packet may include destination media access control (MAC) address (destination address) information, source MAC address (source address) information, length/type information, data information, and an FCS. Alternatively, the packet may further include a preamble, a start of frame delimiter, and the like.

Figure 5:
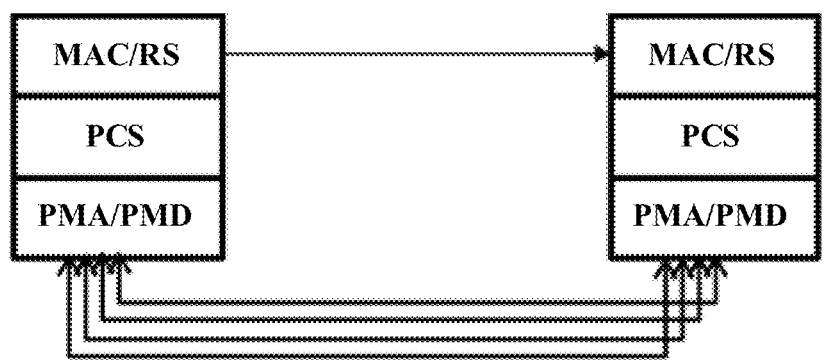
FIG. 5 is a schematic diagram of a hierarchical architecture in a 40G/100G ethernet according to an embodiment of this application.

FIG. 5 is a schematic diagram of a hierarchical architecture in a 40G/100G ethernet. A function of a MAC layer is to check a packet. A function of a reconciliation sublayer (RS) is to provide a signal mapping mechanism between some kind of media independent interface (MII) and the MAC layer. A function of a physical coding sublayer (PCS) is to encode a signal received from the MII. A function of a physical media attachment (PMA) sublayer is to be responsible for signal parallel-to-serial conversion, serial-to-parallel conversion, and the like. A function of a physical media dependent (PMD) layer is to implement interaction between a high-speed analog signal generated by the PMA and a peripheral medium. It may be understood that the functions described in this application are merely examples. During specific implementation, each layer may further include another function or the like. This is not limited in this application.

Generally, in a unit of 8 bits, every 8 bits of a packet are sequentially mapped to a channel 0 to a channel 7 of the MII interface. Then the PCS performs 64B/66B encoding based on a signal received from the MII interface, for example, adds a 2-bit synchronization header to form a 64B/66B bit block. For example, a 7-byte preamble and a 1-byte start frame delimiter (SFD) may be encoded as a start bit block; a 6-byte destination MAC address and a part of source MAC address of 2 bytes is encoded as the first data bit block; and so on, to form some data bit blocks. The last data bit block in some data bit blocks may include an FCS. However, to identify the end of the packet, the PCS may add an end bit block after the last data bit block. Optionally, the end bit block may include the FCS. The FCS shown herein may be included in the end bit block, or may be included in the data bit block. This is not limited in this application.

In this application, when the PCS performs 64B/66B encoding, a value of a preset field in the start bit block may be set to a first value or a third value. When the value of the preset field in the start bit block is the first value, the start bit block may be further referred to as a non-packet start bit block; or when the value of the preset field in the start bit block is the third value, the start bit block may be further referred to as a packet start bit block. Optionally, when performing 64B/66B encoding, the PCS may further set a value of a preset field in the end bit block to different values, to distinguish between a packet end bit block and a non-packet end bit block.

Optionally, when the PCS performs 64B/66B encoding on information such as operation, management, and maintenance information, the information may be encoded as an O bit block. A value of a preset field in the O bit block may be a second value. When the value of the preset field in the O bit block is the second value, it indicates that a function of the O bit block is to feed back retransmission control information.

It may be understood that the foregoing shows only one encoding manner. Another type of encoding manner is also applicable to this application.

5. First Bit Block (Bit Block)

In this application, a first bit block may be a P1 B/P2 B bit block, which may also be referred to as a P1 B/P2 B code block, a P1 B/P2 B block, a P1 B/P2 B bitstream, or the like. P1 represents a payload bit quantity of the first bit block, P2 represents a total bit quantity of the first bit block, P2-P1 represents a synchronization header bit quantity of the first bit block, P1 and P2 are positive integers, and P2 is greater than P1.

In this application, the P1 B/P2 B bit block may be a 64B/66B bit block, a 128B/129B bit block, a 128B/130B bit block, a 128B/131B bit block, a 256B/257B bit block, a 256B/258B bit block, a 512B/513B bit block, a 512B/514B bit block, a 512B/515B bit block, or the like.

For example, FIG. 3A shows different types of 64B/66B bit blocks. As shown in FIG. 3A, 2 bits "10" or "01" at the start are synchronization header bits, and the following 64 bits are payload bits, and may be used to carry payload data or the like. In FIG. 3A, each row represents one code type definition. D0 to D7 represent data bytes, C0 to C7 represent control bytes, S0 represents the start of a MAC frame, and T0 to T7 represent the end of the MAC frame.

Figure 3B:
FIG. 3B is a schematic diagram of a format of another bit block according to an embodiment of this application.
Figure 3B:
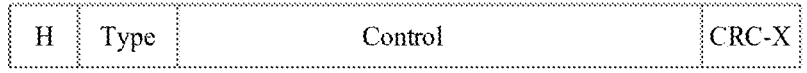
Figure 3B:
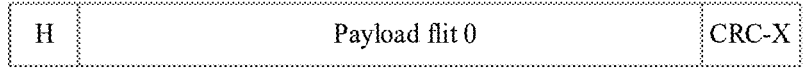
Figure 3B:
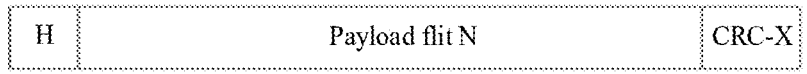
Figure 3B:
Figure 3B:
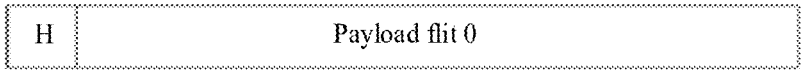
Figure 3B:
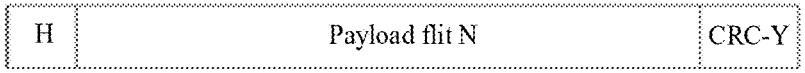
Figure 3B:
Figure 3B:
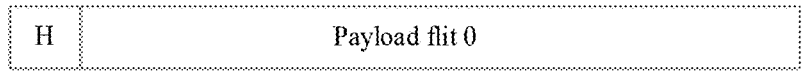

For example, FIG. 3B shows a 128B/131B bit block (merely as an example), which may also be referred to as a flow control unit (flit). The following uses the flit as an example to describe the embodiments provided in this application. As shown in FIG. 3B, header (H) represents a synchronization header of the flit, and different values of H are used to indicate that the flit is a control bit block (which may also be referred to as a control flit) or a data bit block (which may also be referred to as a payload flit). A length of H may be 1 bit, 2 bits, 3 bits, or the like. Different values of a type field are used to indicate a type of the control bit block, for example, a packet start bit block (which may also be referred to as a packet start flit) or an O bit block (which may also be referred to as a feedback flit or an O flit), and a length of the type may be at least 2 bits. Alternatively, to further clearly distinguish the control bit block, different values of the type field may be used to identify whether the type of the control bit block is a packet start flit, an ACK flit, a NACK flit, or the like.

Optionally, a flit shown in FIG. 3B(1) may be usually used to carry request-type, control-type, or management-type information. FIG. 3B(2) to FIG. 3B(4) show cases in which a plurality of flits carry one packet, and are different mainly in different CRC protection manners. In FIG. 3B(2), each flit is protected by CRC-X (for example, X=16, that is, CRC-16), in FIG. 3B(3), a packet start flit is protected by CRC-X, and payload flits 0 to N are protected by CRC-Y (for example, Y=32, that is, CRC-32), and in FIG. 3B(4), a packet start flit and payload flits are protected by CRC-Y.

It may be understood that the foregoing example is shown by using an example in which different values of the type field are used to identify the packet start bit block or the O bit block. During specific implementation, different values of the type field may be alternatively used to identify the packet start bit block, a packet end bit block, the O bit block, or the like. Details are not described herein. Alternatively, a start bit block and an end bit block may be identified by using the type field, and then it may be distinguished, by using another field, whether the start bit block is a packet start bit block or a non-packet start bit block, or it may be distinguished, by using another field, whether the end bit block is a packet end bit block or a non-packet end bit block.

In this application, a generation position of the first bit block is not limited, and a communication apparatus may generate the at least one first bit block in an MII interface, or may generate the at least one first bit block in a PCS. In other words, at least the first bit block may be a P1 B/P2 B bit block generated in the PCS; or the at least one first bit block may be a bit block that includes a control character or a data character and that is generated by using the MII interface, and the bit block that includes the control character or the data character is encoded as a P1 B/P2 B bit block after passing through the PCS.

6. Packet Bit Block and Non-Packet Bit Block

In this application, packet bit blocks may include a boundary bit block and a data bit block, and the boundary bit block may be at least one of a start bit block and an end bit block. Therefore, bit blocks corresponding to a packet may be: A. a start bit block and a data bit block; B. a start bit block, a data bit block, and an end bit block; or C. a data bit block and an end bit block. For example, the packet bit block is at least one of a packet start bit block, a data bit block corresponding to the packet start bit block, an end bit block corresponding to the packet start bit block, a packet end bit block, a start bit block corresponding to the packet end bit block, and a data bit block corresponding to the packet end bit block.

In a possible implementation, a non-packet bit block may be a bit block other than the packet bit block, for example, may be an O bit block transmitted in a packet.

In another possible implementation, a non-packet bit block may be implemented by using a boundary bit block, or certainly, the non-packet bit block may be implemented by using a boundary bit block and a data bit block together. In this case, to distinguish between the packet bit block and the non-packet bit block, a preset value (for example, a first value) may be used for a preset field in the boundary bit block in the non-packet bit block, and a packet boundary bit block and the non-packet boundary bit block may be distinguished by using the preset field. For example, a preset field in a start bit block may be used for distinguishing, to be specific, a packet start bit block and a non-packet start bit block may be distinguished, or a preset field in an end bit block may be used for distinguishing, to be specific, a packet end bit block and a non-packet end bit block may be distinguished.

The following further describes two aspects regarding whether the non-packet bit block includes a boundary bit block.

Manner 1: The non-packet bit block does not include a boundary bit block.

The packet bit block includes a boundary bit block and a data bit block corresponding to the boundary bit block.

The non-packet bit block is a bit block other than the packet bit block, for example, may be an O bit block.

Manner 2: The non-packet bit block includes a boundary bit block.

The packet bit block includes a packet boundary bit block and a data bit block corresponding to the packet boundary bit block.

The non-packet bit block is a bit block other than the packet bit block, for example, may be an O bit block, a non-packet boundary bit block, a data bit block corresponding to the non-packet boundary bit block, or a boundary bit block corresponding to the non-packet boundary bit block. Further, the non-packet bit block may include an O bit block, a non-packet start bit block, a data bit block corresponding to the non-packet start bit block, an end bit block corresponding to the non-packet start bit block, a non-packet end bit block, a data bit block corresponding to the non-packet end bit block, a start bit block corresponding to the non-packet end bit block, or the like. For example, the non-packet bit block may be: A. a non-packet start bit block; B. a non-packet start bit block and a data bit block corresponding to the non-packet start bit block; C. a non-packet start bit block, a data bit block corresponding to the non-packet start bit block, and an end bit block corresponding to the non-packet start bit block; D. a non-packet start bit block and an end bit block corresponding to the non-packet start bit block; E. a non-packet end bit block; F. a data bit block corresponding to a non-packet end bit block and the non-packet end bit block; G. a start bit block corresponding to a non-packet end bit block, a data bit block corresponding to the non-packet end bit block, and the non-packet end bit block; H. a start bit block corresponding to a non-packet end bit block and the non-packet end bit block; I. a non-packet start bit block and a non-packet end bit block; or J. a non-packet start bit block, a data bit block corresponding to the non-packet start bit block, and a non-packet end bit block.

Herein, the data bit block corresponding to the non-packet start bit block may also be referred to as a non-packet data bit block, the end bit block corresponding to the non-packet start bit block may also be referred to as a non-packet end bit block, the start bit block corresponding to the non-packet end bit block may also be referred to as a non-packet start bit block, the data bit block corresponding to the non-packet end bit block may also be referred to as a non-packet data bit block, and the like.

The foregoing shows merely examples, and the non-packet bit block may be alternatively implemented in another form. Details are not described herein. In addition, it should be noted that a sending sequence between bit blocks may also be adjusted. For example, the end bit block may be sent before the start bit block, or the end bit block may be sent before the start bit block.

In other words, the preset field may be used to identify a packet start bit block or a non-packet start bit block. For example, the packet bit block includes a preset field, the non-packet bit block includes a preset field, and a value carried in the preset field may be used to identify a packet start bit block or a non-packet start bit block, or the value carried in the preset field may be used to identify a packet end bit block or a non-packet end bit block. For example, the value carried in the preset field may include a first value or a third value, the first value corresponds to the non-packet bit block, and the third value corresponds to the packet bit block.

Corresponding to the embodiments provided in this application, at least one first bit block includes a preset field, and the preset field may be used to identify whether the at least one first bit block is a packet bit block or a non-packet bit block. For example, a value carried in the preset field may be used to identify a packet start bit block or a non-packet start bit block, or a value carried in the preset field may be used to identify a packet end bit block or a non-packet end bit block. Alternatively, the preset field may be used to identify whether a function of an O bit block is to carry retransmission control information, other information, or the like.

In this application, the preset field may be understood as a preset area, a preset position, or the like in a bit block, and a value is carried in the preset area or the preset position. A specific area, position, or the like of the preset field in the bit block is not limited in this application. The preset field may be located in at least one of a start bit block, an end bit block, and a data bit block.

Figure 4A:
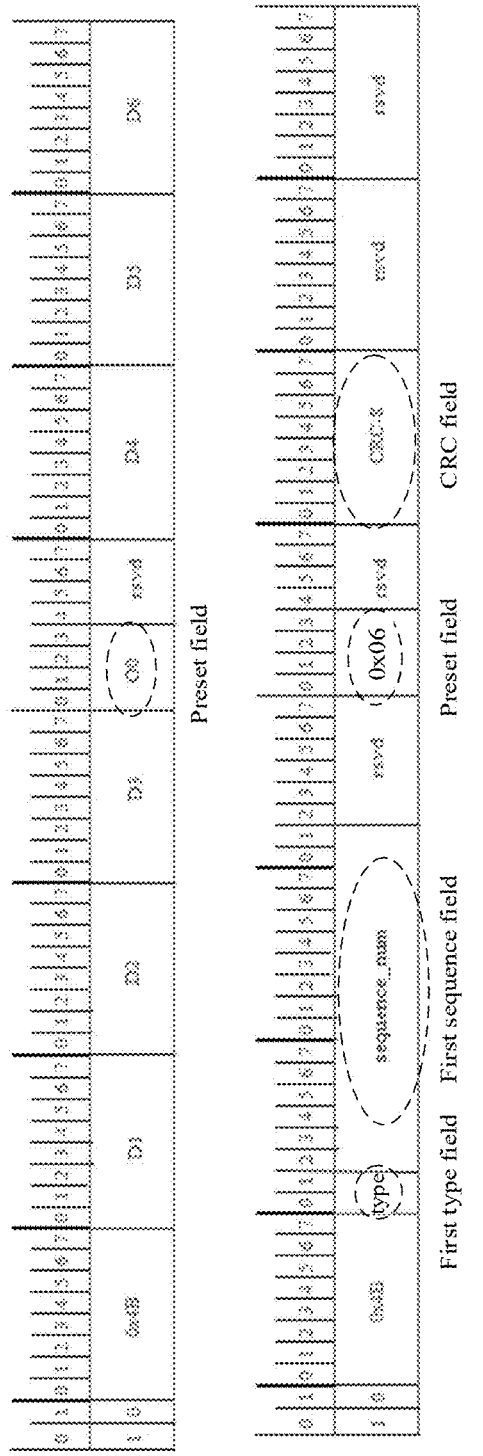
FIG. 4A is a schematic diagram of a format of an O bit block according to an embodiment of this application.
Figure 4B:
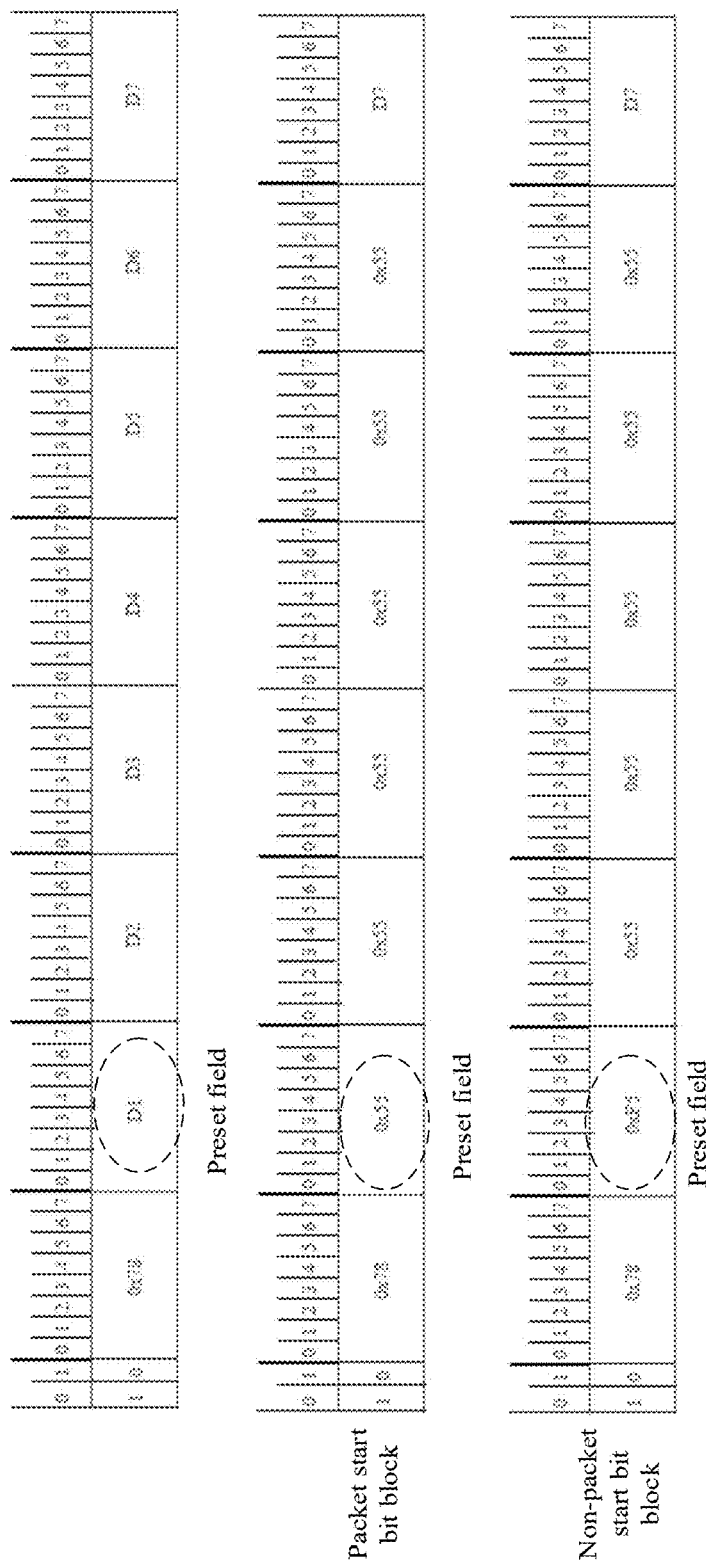
FIG. 4B to FIG. 4D are schematic diagrams of a method for distinguishing a packet bit block from a non-packet bit block according to an embodiment of this application.
Figure 4C:
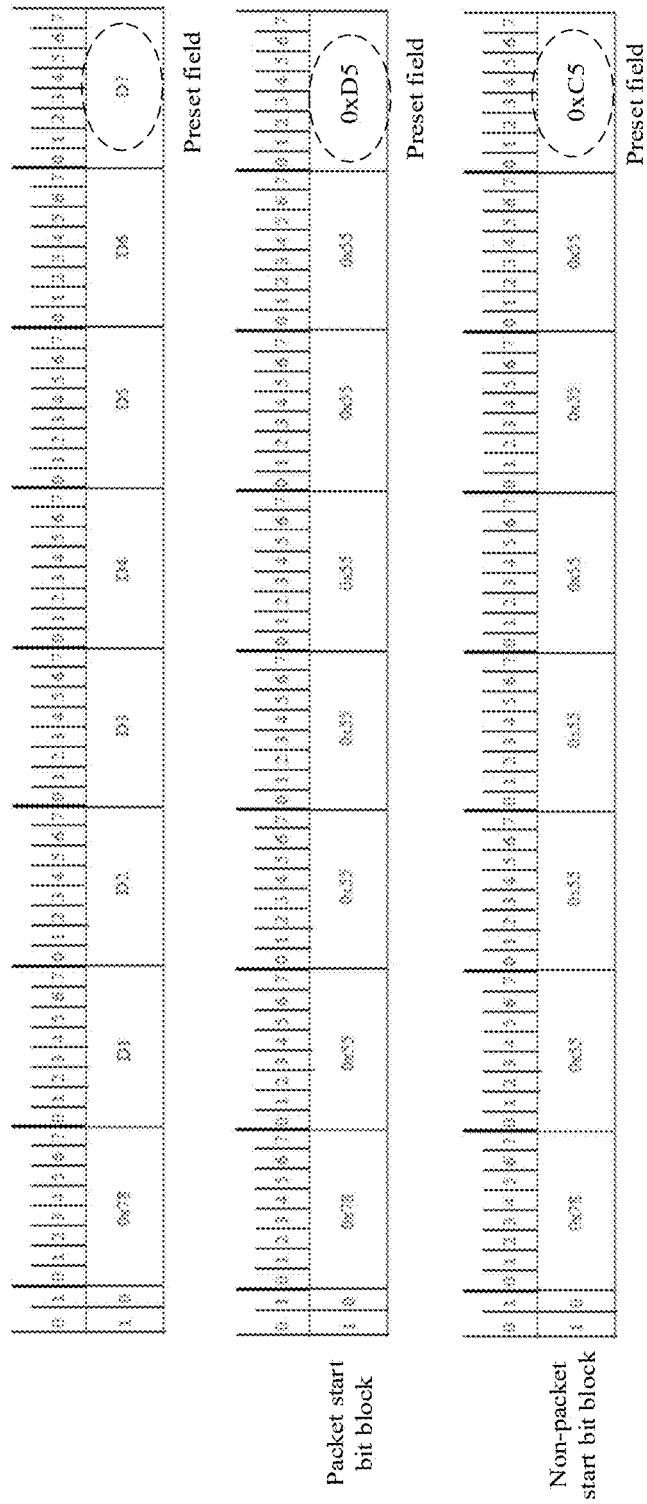
Figure 4D:
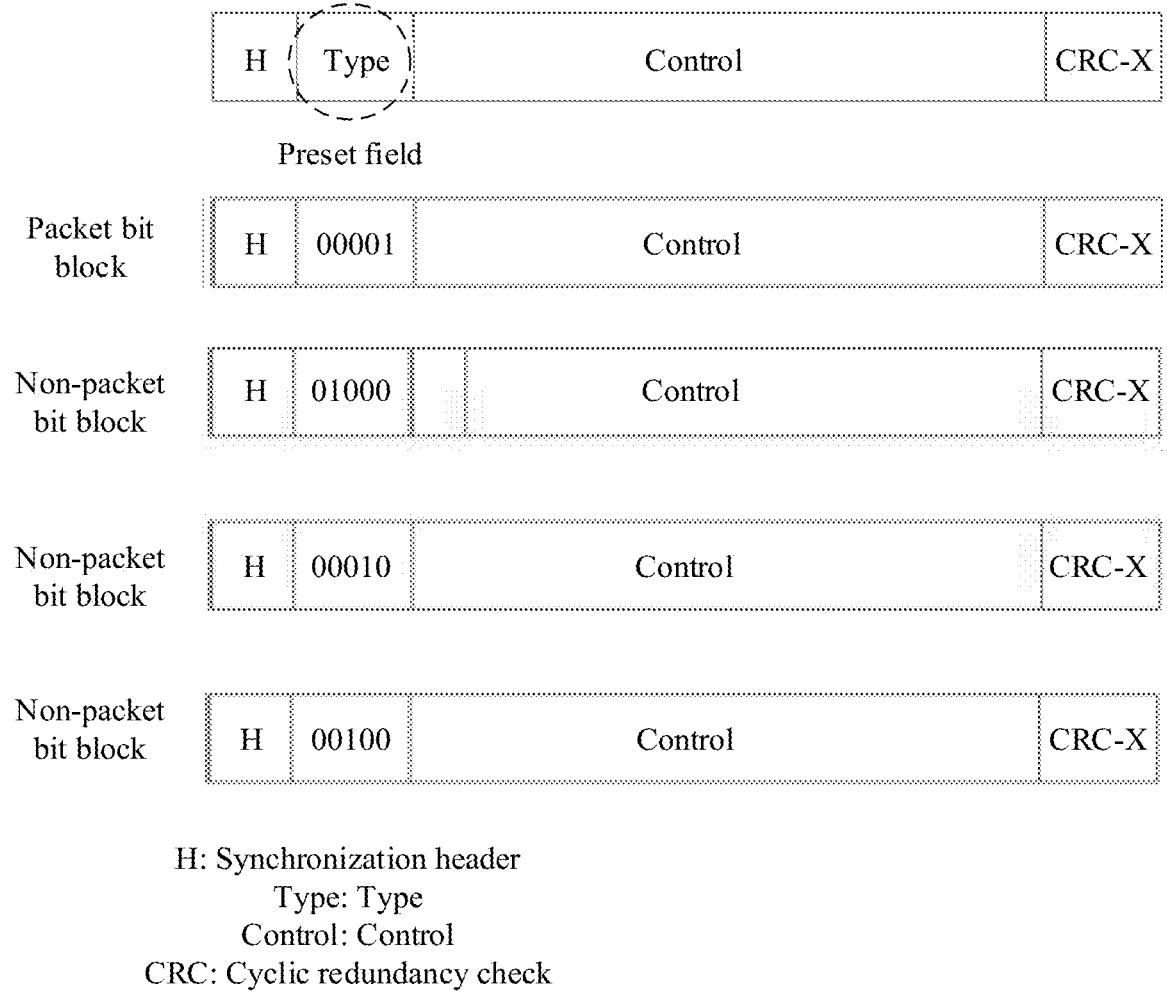

For a more vivid understanding of a difference between the packet bit block and the non-packet bit block, refer to FIG. 4B to FIG. 4D.

FIG. 4B and FIG. 4C show different values of preset fields in a packet start bit block and a non-packet start bit block. A preset field in FIG. 4B may be carried in a D1 area, and a preset field in FIG. 4C may be carried in a D7 area, in other words, the preset field in FIG. 4B may be located in the D1 area, and the preset field in FIG. 4C may be located in the D7 area. As shown in FIG. 4B, a preset field in the non-packet start bit block carries 0xF5 (merely as an example), and a preset field in the packet start bit block carries 0x55. As shown in FIG. 4C, a preset field in the non-packet start bit block carries 0xC5 (merely as an example), and a preset field in the packet start bit block carries 0xD5 (a bit transmission sequence is 10101011). 0xF5 and 0xC5 may be understood as a first value, and 0x55 and 0xD5 may be understood as a third value.

It may be understood that FIG. 4A to FIG. 4C are merely examples. During specific implementation, the preset field may be alternatively located in another area. For example, the preset field in FIG. 4B may be in any one or more of areas D2 to D6 or the like. A specific value of the first value carried in the preset field in the non-packet bit block is not limited in this application, either. It may be understood that the first value shown in this application is merely a collective term, and first values in specific implementations or in different embodiments are not limited to a same value in this application. The descriptions of the first value shown herein are also applicable to another value such as the third value, a fourth value, or a fifth value. Details are not described below.

It may be understood that schematic diagrams of comparison shown in FIG. 4B and FIG. 4c are shown by using an example in which the preset field is located in a start bit block. However, in this application, the preset field may be alternatively located in an end bit block. To be specific, a packet end bit block and a non-packet end bit block are distinguished by using different values of a preset field in the end bit block. For specific descriptions of the preset field in the end bit block, refer to FIG. 4B and FIG. 4C. Details are not described herein again. Without loss of generality, the following uses an example in which the preset field is located in the start bit block to illustrate the embodiments provided in this application.

FIG. 4D shows different values of a preset field in a flit. For example, when the preset field carries 00001, it indicates that the flit is a packet start flit; or when the preset field carries 01000, it indicates that the flit is an O flit. Whether the O bit block is specifically an ACK bit block or a NACK bit block may be indicated by using another field, for example, an area that is in the third graph in FIG. 4D and that is located after 01000. It may be understood that for specific descriptions of the flit, further refer to FIG. 11A. Table 1 shows an example of a method for distinguishing the non-packet bit block from the packet bit block.

TABLE 1

| Bit block name | Position of the preset field | Value of the preset field | Packet bit block | Non-packet bit block |
| --- | --- | --- | --- | --- |
| S0 bit block | D1 area | 0x55 (namely, the | Yes | No |

TABLE 1-continued

| Bit block name | Position of the preset field | Value of the preset field | Packet bit block | Non-packet bit block |
| --- | --- | --- | --- | --- |
| | | third value) | | |
| S0 bit block | D1 area | 0xF5 (namely, the first value) | No | Yes |
| Flit bit block | Type area | 00001 (namely, the third value) | Yes | No |
| Flit bit block | Type area | 01000 (namely, a second value) | No | Yes (O bit block) |

In this application, the preset field may not only be used to identify the packet bit block and the non-packet bit block. Optionally, different values of the preset field may be used to identify the packet bit block, the ACK bit block, and the NACK bit block. The ACK bit block and the NACK bit block may be understood as non-packet bit blocks. For example, when the preset field carries 00001, it indicates that the flit is a packet start flit. When the preset field carries 00010, it indicates that the flit is an ACK flit, which may also be referred to as an ACK bit block, an O bit block, or the like; or when the preset field carries 00100, it indicates that the flit is a NACK flit, which may also be referred to as a NACK bit block, an O bit block, or the like. Table 2 shows an example of a method for distinguishing the packet bit block, the ACK bit block, and the NACK bit block.

TABLE 2

| Bit block name | Position of the preset field | Value of the preset field | Packet bit block | Non-packet bit block |
| --- | --- | --- | --- | --- |
| Flit bit block | Type area | 00001 (namely, the third value) | Yes | No |
| Flit bit block | Type area | 00010 (namely, the second value) | No | Yes (ACK bit block) |
| Flit bit block | Type area | 00100 (namely, the second value) | No | Yes (NACK bit block) |

It may be understood that the value of the preset field shown above is merely an example. During specific implementation, the preset field for distinguishing the non-packet start bit block from the packet start bit block may be alternatively located in another area, or may be used to carry another value or the like. This is not limited in this application, provided that the non-packet bit block and the packet bit block can be distinguished by using different values of a same field.

7. O Bit Block

The preset field shown above is mainly used to identify the packet bit block and the non-packet bit block. However, for a control bit block such as an O bit block, the preset field may be used to identify information carried in the O bit block. Optionally, different values carried in the preset field in the O bit block are used to identify whether the O bit block is used to carry retransmission control information, flow control information, or the like. In other words, different values carried in the preset field correspond to different information, and one value corresponds to one type of information. For example, when the preset field in the O bit block carries a second value, the O bit block is used to carry retransmission control information; or when the preset field in the O bit block carries a sixth value, the O bit block may be used to carry flow control information or the like (merely as an example).

A preset field in an O bit block in FIG. 4A may be carried in an O0 area, in other words, the preset field in the O bit block may be located in the O0 area, or a specific position of the preset field may be located in the O0 area. In addition, in this application, the preset field may carry the second value such as 0x06 (merely as an example). To be specific, when the preset field in the O bit block carries 0x06, it indicates that the O bit block is used to feed back retransmission control information. For example, the retransmission control information indicates whether a packet is correctly received or a packet transmitted after the O bit block is a retransmitted packet.

In other words, when the preset field in the O bit block carries the second value, it may indicate that a function of the O bit block is to feed back whether a communication apparatus correctly receives at least one first packet sent by a peer end; or when the preset field in the O bit block carries the second value, it may indicate that a function of the O bit block is to indicate that a subsequently transmitted packet is a retransmitted packet. Regarding whether the function of the O bit block is to feed back an ACK or a NACK or to indicate that a subsequently transmitted packet is a retransmitted packet, refer to descriptions in Table 4 or FIG. 12A to FIG. 12E. Details are not described herein again.

It may be understood that FIG. 4A shows only an O bit block corresponding to FIG. 3A. Specific descriptions of an O flit corresponding to FIG. 3B are not described herein.

It may be understood that, that a specific field carries a specific value described in this application may also mean that a value of the specific field is the specific value. The description is also applicable to the following embodiments.

8. Bit Position

For example, as shown in FIG. 3A, for a data bit block (the first row in FIG. 3A), 8 bits at bit positions 2 to 9 are a D0 area, and 8 bits at bit positions 10 to 17 are a D1 area. For an S0 bit block, 8 bits at bit positions 2 to 9 are 0x78 (in other words, a block type field is 0x78), and 8 bits at bit positions 10 to 17 are a D1 area. For a T7 bit block, 8 bits at bit positions 2 to 9 are 0xFF (in other words, a block type field is 0xFF), and 8 bits at bit positions 10 to 17 are a D0 area. It may be understood that all of start bit positions of bit blocks shown in this application are 0. If the start bit position is 1, a bit position occupied by 0x78 of the S0 bit block may be 8 bits at bit positions 3 to 10. In other words, a value of the start bit position is not limited in this application.

Only the bit position is described herein. However, a relationship between the bit position and a bit transmission sequence is not limited in this application. For example, for the S0 bit block shown in FIG. 3B, the 8 bits at the bit positions 2 to 9 are 0x78, but specific bit positions of the 8 bits "01111000" corresponding to the bit positions are not limited in this application. For example, the 8 bits at the bit positions 2 to 9 in the S0 bit block may be sequentially 01111000 or 00011110. This is not limited in this application.

When a receive end feeds back an ACK packet or a NACK packet to a transmit end, because a length of the packet is usually relatively large, the ACK packet or the NACK packet fed back by the receive end may cause packet blocking. Especially, when the receive end is sending another packet (for example, a second packet) while feeding back the NACK packet, the receive end may be unable to send the NACK packet in a timely manner. Once sending of the NACK packet is delayed, a time at which the transmit end retransmits a packet incorrectly received by the receive end is also delayed. Therefore, service FCT is also delayed, resulting in low network utilization.

In view of this, this application provides a bit block sending method and an apparatus. A receive end can feed back, to a transmit end, whether at least one first packet is correctly received, and also feed back an ACK or a NACK in a form of a bit block, so that a possibility that the ACK or the NACK can be sent in a timely manner is higher, and a feedback manner is more flexible. Further, feeding back the ACK or the NACK in the form of a bit block can further interrupt a second packet currently being sent by the receive end, to reduce a waiting delay of the ACK or the NACK. In addition, the transmit end can retransmit, in a timely manner, at least one first packet incorrectly received by the receive end, so that the transmit end can clear a replay buffer in a timely manner, and can also reduce a delay of FCT and improve network utilization.

The method provided in this application may not only be applied to an information technology (IT) network that is based on Peripheral Component Interconnect Express (PCIe) or a flit, but also be applied to the ethernet, an Internet Protocol (IP) network, a packet transport network (PTN), an agile transport network (ATN), a slicing packet network (SPN), and the like. A network to which the method provided in this application may be applied is not limited. Specifically, the method provided in this application may be applied to a communication apparatus, and the communication apparatus may be an apparatus that supports PCIe, a flit, an ethernet technology, or the like. For example, the communication apparatus may be any form of computer, server, switch (also referred to as switching device, switching chip, or the like), router, or network adapter. A specific form of the communication apparatus is not limited in this application.

Optionally, the method provided in this application may be applied to two communication apparatuses. For example, the two communication apparatuses may include a transmit end and a receive end. For specific forms of the transmit end and the receive end, refer to the form of the foregoing communication apparatus. Optionally, the transmit end and the receive end may be further understood as any two interfaces or the like. In other words, the method provided in this application may be applied to a link-level (also referred to as point-to-point) scenario. The link-level scenario may include a transmit end and a receive end. In a process of transmitting a packet (for example, a first packet, a second packet, or at least one first bit block), the packet is not lost, but a transmission error may occur. For example, when the receive end receives a first packet from the transmit end, the receive end may check, by using CRC information included in the first packet, whether the first packet is correctly received, without considering whether the packet is lost or the like.

In this application, the transmit end may be understood as a communication apparatus for sending at least one first packet, and the receive end may be understood as a communication apparatus for receiving the at least one first packet, or the receive end may be further understood as a communication apparatus for feeding back whether the first packet is correctly received. Alternatively, in this application, the transmit end may be understood as a communication apparatus for receiving at least one second packet, or the transmit end may be further understood as a communication apparatus for feeding back whether the second packet is correctly received, and the receive end may be understood as a communication apparatus for sending the at least one second packet. It may be understood that the packet shown in this application may also be referred to as a frame or the like. Another name of the packet is not limited in this application.

Figure 6:
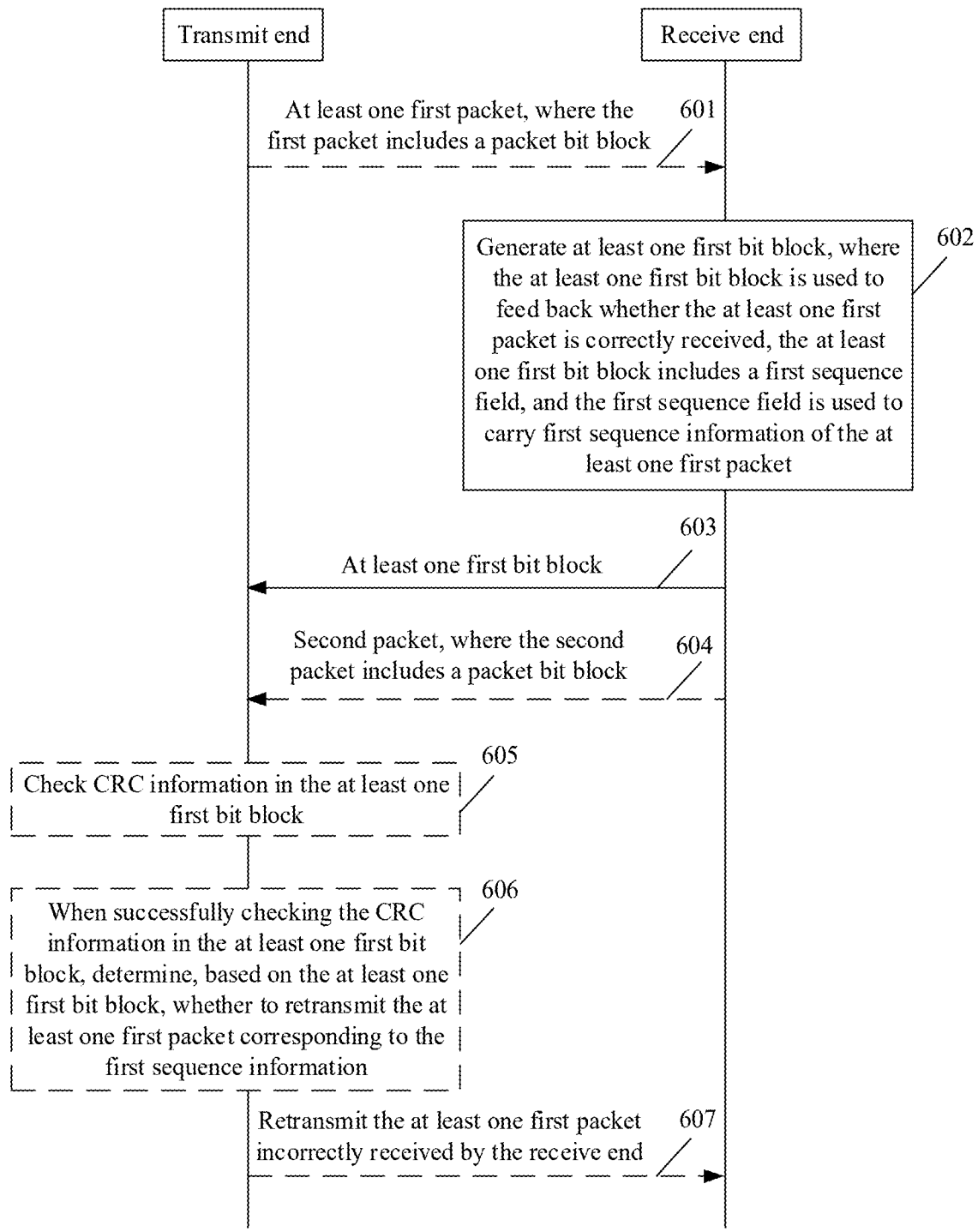
FIG. 6 is a schematic flowchart of a bit block sending method according to an embodiment of this application.

FIG. 6 is a schematic flowchart of a bit block sending method according to an embodiment of this application. As shown in FIG. 6, the method includes the following steps.

In a possible implementation, the method shown in FIG. 6 includes step 601.

601: A transmit end sends at least one first packet to a receive end, where the first packet includes a packet bit block, and correspondingly, the receive end receives the at least one first packet.

Optionally, the first packet may include a packet start bit block, a data bit block corresponding to the packet start bit block, and an end bit block corresponding to the packet start bit block (merely as an example). For example, the first packet may include a packet start bit block (for example, S0), a packet data bit block (for example, D0 to D7), and a packet end bit block (for example, T0 to T7) shown in FIG. 3A. Optionally, the first packet may include a packet start bit block and a data bit block corresponding to the packet start bit block. For example, the first packet may include a packet start bit block and a packet data bit block shown in FIG. 3B(2). For a specific value of a preset field in the packet start bit block, refer to the foregoing descriptions. Details are not described herein again.

In some implementations, the packet start bit block of the first packet includes a third sequence field, and the third sequence field is used to carry third sequence information. In this case, the third sequence information may be a sequence number of the first packet. Optionally, to enable the receive end to clearly learn of the sequence number of the first packet, the packet start bit block of the first packet may further include a third type field. When the third type field carries a fourth value (for example, 2b01), the third sequence information is the sequence number of the first packet. In other words, the packet start bit block of the first packet may directly include the third sequence field to indicate the sequence number of the first packet, or may further include the third type field to indicate a specific meaning of the third sequence information. Table 3 shows different meanings of the third sequence information that correspond to different values of the third type field.

TABLE 3

| Bit block name | S0 bit block | Flit bit block |
| --- | --- | --- |
| Position of a preset field | D1 area | Type area |
| Value of the preset field | 0x55 (namely, a third value) | 00001 (namely, the third value) |
| Packet bit block | Yes | Yes |
| Value of the third type field | 2b01: indicating a sequence number of a current packet | 2b01: indicating a sequence number of a current packet |
| Value of the third type field | 2b10: a sequence number of an ACK | 2b10: a sequence number of an ACK |
| Value of the third type field | 2b11: a sequence number of a NACK | 2b11: a sequence number of a NACK |

It may be understood that for specific descriptions of the third sequence field, the third type field, and a CRC field, further refer to FIG. 7A and FIG. 7B, or FIG. 12A to FIG. 12C. Details are not described herein again.

In this embodiment of this application, the packet start bit block of the first packet may further include a CRC field. The CRC field is used to carry CRC information, and the CRC information is used to protect the third sequence information in the packet start bit block of the first packet or the like. However, the packet data bit block or the packet end bit block of the first packet may further include another CRC field (which may also be referred to as an FCS field), and CRC information carried in the CRC field is used to protect service data or the like in the first packet. In this case, after receiving the first packet, the receive end may determine, based on the CRC information carried in another CRC field included in the first packet, whether the first packet is correctly received. In addition, the receive end may further check the CRC information in the packet start bit block of the first packet. If the check succeeds, it indicates that the third sequence information included in the first packet is correctly received.

The CRC field and the other CRC field shown above are mutually independent. For example, if the CRC information in the CRC field is successfully checked, and the CRC information in the other CRC field is unsuccessfully checked, it may still indicate that the third sequence information is correctly received. In this case, the receive end may obtain the third sequence information of the first packet, but the transmit end needs to retransmit the first packet. For another example, if the CRC information in the CRC field is unsuccessfully checked, but the CRC information in the other CRC field is successfully checked, it indicates that the third sequence information is incorrectly received. In this case, the receive end may not obtain the third sequence information of the first packet, and the transmit end also needs to retransmit the first packet.

It may be understood that the description is also applicable to a second packet, and details are not described below.

In other implementations, alternatively, the packet start bit block of the first packet may not include the third sequence field. For specific descriptions of the implementations, further refer to FIG. 12D, FIG. 12E, and the like. Details are not described herein.

602: The receive end generates at least one first bit block. The at least one first bit block is used to feed back whether the at least one first packet is correctly received, the at least one first bit block includes a first sequence field, and the first sequence field is used to carry first sequence information of the at least one first packet.

In a possible implementation, the preset field may be used to indicate that the first sequence information is a sequence number of the last first packet in at least one correctly received first packet. Optionally, a preset field may be used to indicate that the first sequence information is a sequence number of the $1^{st}$ packet in at least one incorrectly received first packet. In other words, different values of the preset field can distinguish a packet bit block from a non-packet bit block, and can also distinguish whether the at least one first bit block is an ACK bit block or a NACK bit block, as shown in Table 1.

In a possible implementation, the at least one first bit block may further include a first type field, the first type field may be used to indicate a type of the at least one first bit block, and the type of the at least one first bit block may be an ACK bit block or a NACK bit block. In other words, different values carried in the first type field may be used to indicate whether the at least one first bit block is an ACK bit block or a NACK bit block. The transmit end may further determine, based on a value carried in the first type field, whether the first packet corresponding to the first sequence information needs to be retransmitted. Taking a go-back-N protocol as an example, the first sequence information may be the sequence number of the last first packet in the at least one correctly received first packet. In other words, the first sequence information may indicate a sequence number of one of the at least one first packet.

However, if a SACK is used as an example, the first sequence field may further include fourth sequence information and fifth sequence information. The fourth sequence information is a sequence number of the $1^{st}$ first packet in consecutively correctly received first packets, and the fifth sequence information is a sequence number of the last first packet in the consecutively correctly received first packets. In this case, a length of the first sequence field may be appropriately increased or the like, and the value carried in the first type field may be different from a value carried in a first type field in the NACK bit block. A specific value of the first type field is not limited in this embodiment of this application provided that the transmit end can distinguish, when obtaining the at least one first bit block, whether the at least one first bit block is a NACK bit block or a SACK bit block. It may be understood that for specific descriptions of the SACK, further refer to related descriptions of FIG. 1C. Details are not described again in this embodiment of this application.

For ease of description, the following uses an example in which the go-back-N protocol is used and the first sequence information is the sequence number of the last first packet in the at least one correctly received first packet.

In a possible implementation, the at least one first bit block may further include a CRC field, and the CRC field is used to carry CRC information. The CRC information may be used to protect the at least one first bit block. Specifically, the CRC information may be used to protect the first sequence information or the like in the at least one first bit block.

The first sequence field, the first type field, and the CRC field shown above may be in a same bit block in the at least one first bit block, or may be partially in a same bit block, or may be in different bit blocks. This is not limited in this embodiment of this application.

603: The receive end sends the at least one first bit block to the transmit end, and correspondingly, the transmit end receives the at least one first bit block.

In a possible implementation, the method shown in FIG. 6 may further include step 604.

604: The receive end sends a second packet to the transmit end, where the second packet includes a packet bit block, and correspondingly, the transmit end receives the second packet.

Optionally, a start bit block of the second packet includes a second sequence field, and the second sequence field is used to carry second sequence information. For specific descriptions of the second packet, refer to the descriptions of the first packet in step 601. Details are not described herein again.

The following describes a specific form of the first bit block in detail.

Implementation 1: The First Bit Block is a Non-Packet Bit Block.

To be specific, the first bit block is different from a bit block included in the first packet (for example, the bit block included in the first packet may be referred to as a second bit block), and the first bit block is also different from a bit block included in the second packet (for example, the bit block included in the second packet may be referred to as the second bit block). In other words, a value carried in a preset field in the at least one first bit block may be a first value or a second value, and a value carried in a preset field in a packet start bit block of the second packet or the first packet may be a third value.

In some implementations of this application, if the receive end does not send the second packet when sending the at least one first bit block, the receive end may separately send the at least one first bit block. For example, the receive end sends the second packet when completing sending the at least one first bit block; or the receive end sends the at least one first bit block when completing sending the second packet.

In other implementations of this application, if the receive end is sending the second packet when sending the at least one first bit block, the receive end may insert the at least one first bit block into a bit block stream of the second packet for sending. In other words, the receive end may interrupt the bit block stream of the second packet currently being sent, and insert the at least one first bit block into the bit block stream of the second packet. In this case, step 603 shown above may be further replaced with the following: The receive end sends the at least one first bit block to the transmit end after sending the packet start bit block of the second packet and before completing sending the second packet.

For implementation 1, the at least one first bit block may include the first sequence field, the first type field, the CRC field, and the preset field described above. The second sequence information may be a sequence number of the second packet. Optionally, the packet start bit block may further include a second type field, the second type field carries a fourth value (for example, 2b01), and the second type field is used to indicate (which may be understood as clearly indicating or explicitly indicating) that the second sequence information is the sequence number of the second packet. Optionally, the second packet may not include the second sequence field. For specific descriptions of the second sequence information, further refer to FIG. 12A to FIG. 12E. Details are not described herein again.

For different types of bit blocks, preset fields are located in different areas. Therefore, in implementation 1, for the transmit end, when the CRC information in the at least one first bit block is successfully checked, the transmit end may obtain, based on a block type field of the at least one first bit block, the value carried in the preset field. If the value carried in the preset field in the at least one first bit block is the first value, the type of the at least one first bit block is obtained from the first type field in the at least one first bit block, and it is determined, based on the type of the at least one first bit block, whether to retransmit the first packet corresponding to the first sequence information. For example, if the at least one first bit block includes a non-packet start bit block, a block type field of the non-packet start bit block is 8 bits at bit positions 2 to 9, and a value of the block type field is 0x78. Optionally, when the first bit block is a flit, because preset fields in different types of bit blocks may be located in a same area, the transmit end may determine, by directly obtaining the value carried in the preset field and the value carried in the first type field, whether to retransmit the first packet corresponding to the first sequence information. Alternatively, if the at least one first bit block is at least one O bit block, a block type field of the at least one O bit block is 8 bits at bit positions 2 to 9, and a value of the block type field is 0x4B. Then it is determined, based on a value, for example, the second value, carried in a preset field in the at least one O bit block and the value carried in the first type field, whether to retransmit the first packet corresponding to the first sequence information.

Implementation 2: The First Bit Block is a Packet Bit Block.

When the receive end feeds back, to the transmit end, whether the at least one first packet is correctly received, the receive end may need to send a second packet, but the second packet has not been sent. In this case, the receive end may feed back, in the second packet, whether the at least one first packet is correctly received. For example, for a format of the second packet sent by the receive end, refer to the format of the first packet shown in Table 3, FIG. 7A, or FIG. 7B. For a specific format of the second packet, details are not described herein again.

For implementation 2, a second type field in the second packet sent by the receive end may carry a fifth value (for example, 2b10 or 2b11), and the second type field may be used to indicate that the second sequence information is a sequence number that is of a correctly received first packet and that is fed back. In other words, the second type field in the second packet may indicate, by carrying 2b01 or 2b11, whether a sequence number of an ACK or a NACK is fed back in the second packet. The at least one first bit block in step 603 is carried in the second packet shown herein, and is sent together with the second packet. The second packet and the second packet in step 604 may be understood as different second packets (in other words, may be understood as not a same packet).

In Implementation 2, for the transmit end, the transmit end may check CRC information carried in another CRC field of the second packet, and check CRC information carried in a CRC field in a packet start bit block of the second packet. In this case, provided that the CRC information carried in the CRC field in the packet start bit block of the second packet is successfully checked, the transmit end may determine, based on the value carried in the preset field and the value carried in the second type field, whether to retransmit the first packet corresponding to the first sequence information. If the CRC information carried in the other CRC field of the second packet is unsuccessfully checked, the transmit end may send at least one first bit block to the receive end to indicate the receive end to retransmit the second packet. For specific descriptions of the at least one first bit block sent by the transmit end to the receive end, refer to the descriptions of the at least one first bit block sent by the receive end to the transmit end. Details are not described again in this embodiment of this application.

In a possible implementation, the method shown in FIG. 6 may further include step 605 to step 607.

605: The transmit end checks CRC information in the at least one first bit block.

606: When successfully checking the CRC information in the at least one first bit block, the transmit end determines, based on the at least one first bit block, whether to retransmit the at least one first packet corresponding to the first sequence information.

In this embodiment of this application, if the transmit end unsuccessfully checks the CRC information in the at least one first bit block, the transmit end may directly drop the at least one first bit block.

In this embodiment of this application, the transmit end may distinguish a packet bit block from a non-packet bit block by obtaining the value carried in the preset field. If the preset field carries the first value, the transmit end may learn, from the first type field, whether the at least one first bit block is an ACK bit block or a NACK bit block. For example, if the first sequence information is a sequence number n, and the type of the at least one first bit block is an ACK bit block, the transmit end determines not to retransmit the at least one first packet. In addition, the transmit end may delete a first packet of the sequence number n and a first packet of a sequence number before the sequence number n from a replay buffer. If the type of the at least one bit block is a NACK bit block, the transmit end determines to retransmit a first packet of a sequence number n+1 and a first packet of a sequence number after the sequence number n+1. In addition, the transmit end may obtain a corresponding first packet from the replay buffer, and retransmit the corresponding first packet. Optionally, the transmit end may also learn, by using different block type fields of the bit block, whether the bit block is an O bit block. If the bit block is an O bit block, a function of the O bit block is obtained by using a preset field. If the preset field carries the second value, it is determined, based on a first type field and a first sequence field of the O bit block, whether to retransmit the at least one first packet corresponding to the first sequence information.

Optionally, step 606 may include: The transmit end obtains a value carried in a preset field in the at least one first bit block, and determines, based on the value carried in the preset field, whether to retransmit the first packet corresponding to the first sequence information.

For this implementation, for example, in a flit bit block, it is distinguished, by using only a preset field, whether the at least one first bit block is an ACK bit block or a NACK bit block. In other words, in this case, alternatively, the at least one first bit block may not include the first type field, as shown in Table 1.

It may be understood that for specific descriptions of step 605 and step 606, further refer to the descriptions of the transmit end in the foregoing Implementation 1 and Implementation 2. Details are not described herein again.

607: When determining that at least one first packet needs to be retransmitted, the transmit end retransmits the at least one first packet incorrectly received by the receive end.

In this embodiment of this application, the receive end feeds back an ACK or a NACK to the transmit end in a form of a first bit block instead of a form of a packet, so that the receive end can send the at least one first bit block in a timely manner, and a transmission delay of the first bit block is reduced as much as possible, thereby preventing another packet from being blocked because transmission time of the at least one first bit block is excessively long. In addition, the first bit block is a non-packet bit block. For example, a value carried in a preset field in a non-packet start bit block is different from a value carried in a preset field in a packet start bit block. Therefore, the non-packet bit block and a packet bit block can be distinguished by the receive end or the transmit end. Alternatively, a value carried in a preset field in at least one O bit block is different from a value carried in a preset field in another O bit block. Therefore, the transmit end or the receive end can distinguish a function of the at least one O bit block based on the value of the preset field. In addition, the first bit block can be further inserted into the bit block stream of the second packet for sending, so that a waiting delay of the at least one first bit block and a delay of FCT are further reduced, and network utilization is improved.

To more vividly understand the method shown in FIG. 6, the following shows specific embodiments in different forms of the at least one first bit block. It may be understood that for specific descriptions of a preset field in the embodiments shown below, refer to the foregoing descriptions. The preset field is not described in detail below.

Embodiment 1

At least one first bit block includes at least one O bit block, and a preset field in each O bit block carries a second value.

In this embodiment of this application, a first type field, a first sequence field, and a CRC field may be located at bit positions 10 to 33 and 38 to 65 in the O bit block. The first type field, the first sequence field, and the CRC field may be located at different bit positions. In other words, bits occupied by the three fields do not overlap each other. In addition, a length of the first type field includes at least 1 bit. For example, the length of the first type field may be 1 bit, 2 bits, or 3 bits. A length of the first sequence field includes at least 2 bits. For example, the length of the first sequence field may be 8 bits, 14 bits, 16 bits, or 22 bits. The length of the first sequence field may be determined based on a quantity of packets that can be buffered in a replay buffer of a communication apparatus, a maximum capacity that can be buffered in the replay buffer, or the like. This is not limited in this embodiment of this application. A length of the CRC field may be 4 bits, 8 bits, 16 bits, 32 bits, or the like. The length of the CRC may be determined based on a CRC check manner. It may be understood that the length of the first type field, the length of the first sequence field, and the length of the CRC field are also applicable to embodiments shown below, and details are not described below.

For example, bit positions of the first sequence field, the first type field, and the CRC field in the O bit block may be separately shown in FIG. 4A. To be specific, 2 bits at bit positions 10 and 11 in the O bit block may be used to carry the first type field, 16 bits at bit positions 12 to 27 in the O bit block may be used to carry the first sequence field, and 8 bits at bit positions 42 to 49 in the O bit block may be used to carry the CRC field.

For example, when the first type field carries 2b01, it indicates that the at least one O bit block is used to feed back a case in which at least one first packet is incorrectly received, in other words, it indicates that the at least one O bit block is a NACK bit block; or when the first type field carries 2b10, it indicates that the at least one O bit block is used to feed back a case in which at least one first packet is correctly received, in other words, it indicates that the at least one O bit block is an ACK bit block; or when the first type field carries 2b11, it indicates that the at least one O bit block is used to indicate that a subsequently transmitted packet is a retransmitted packet. For example, Table 4 shows values and meanings of different fields in the O bit block.

TABLE 4

| Bit block name | O bit block |
|---|---|
| Position of a preset field | O0 area |
| Value of the preset field | 0x06 (namely, the second value) |
| First type field | 2b01: a NACK bit block |
| First type field | 2b10: an ACK bit block |
| First type field | 2b11: A subsequent packet is a retransmitted packet |

For example, a receive end currently receives a first packet (which may also be referred to as an ethernet frame or the like) of a sequence number 21, and a CRC result calculated by the receive end is inconsistent with a CRC result included in the first packet. The receive end generates at least one O bit block. A format of each O bit block may be shown in FIG. 8A.

When the receive end needs to send the at least one O bit block, the receive end is currently sending a second packet to a transmit end. From a perspective of a 64B/66B codec layer, the second packet may be understood as a packet bit block stream of S (packet start bit block) DDD . . . D (namely, data bit blocks corresponding to the packet start bit block) T (namely, an end bit block corresponding to the packet start bit block). As shown in FIG. 8B, the receive end may directly send the at least one O bit block before completing sending the packet bit block stream of the second packet. FIG. 8B shows one O bit block. To be specific, the receive end may interrupt the packet bit block stream of the second packet currently being sent, and insert the at least one O bit block into the packet bit block stream of the second packet, to send the at least one O bit block.

The transmit end receives the second packet from the receive end. Before the transmit end completes receiving the packet bit block stream of the second packet, the transmit end receives a control bit block, and learns that a block type field of the control bit block is 0x4B and a preset field carries 0x06. If a CRC result calculated by the transmit end is consistent with a CRC result in the control bit block, the transmit end obtains first sequence information, namely, a sequence number, from a first sequence field of the control bit block, and learns, based on a value carried in a first type field, that a type of the O bit block is a NACK bit block. Therefore, the transmit end may learn that a first packet of a sequence number 20 is correctly received but a first packet of a sequence number after the sequence number 20 is incorrectly received and needs to be retransmitted.

Then the transmit end obtains the first packet of the sequence number 21 from the replay buffer, and retransmits the first packet of the sequence number 21 and a packet after the first packet of the sequence number 21. Then the transmit end retransmits the first packet of the sequence number 21 and a first packet of a sequence number after the sequence number 21. It may be understood that if the transmit end is currently sending another first packet (initially transmitted first packet) when the transmit end needs to retransmit the first packet of the sequence number 21, the transmit end interrupts the initially transmitted first packet, and immediately sends the first packet of the sequence number 21 and a subsequent first packet. In addition, the interrupted first packet may be buffered into the replay buffer. It may be understood that the specific descriptions of retransmitting the first packet of the sequence number 21 by the transmit end are also applicable to the following embodiments, and details are not described below.

Optionally, before the transmit end retransmits the first packet, the transmit end may further first send at least one O bit block (for example, one, two, or three O bit blocks). A first type field of each O bit block carries 2b11. As shown in Table 4, when a value of the first type field of the O bit block is 2b11, it indicates that a packet after the O bit block is a retransmitted packet. Therefore, the at least one O bit block is used to indicate, to the receive end, that the packet after the O bit block is a retransmitted packet.

Optionally, if the transmit end needs, when retransmitting the first packet of the sequence number 21, to feed back whether a first packet sent by the receive end is correctly received, the transmit end may further insert at least one generated first bit block into a bit block stream of the first packet of the sequence number 21.

It may be understood that this embodiment of this application shows only one type of control bit block, namely, the O bit block, but another control bit block shown in FIG. 3A is also applicable to this embodiment of this application. For example, the at least one first bit block may further include at least one idle bit block, or may further include at least one low power idle (LPI) bit block. For specific descriptions of the idle bit block and the LPI bit block, refer to the descriptions of the O bit block. Details are not described in this embodiment of this application.

For Embodiment 1, the following briefly analyzes beneficial effects of this embodiment of this application based on a formula.

In this embodiment of this application, after the first packet of the sequence number 21 is incorrectly received, according to the method provided in Embodiment 1, the receive end feeds back a NACK bit block, and in this case, a quantity of first packets that need to be retransmitted by the transmit end meets the following formula:

$$TLP_{eachreplay} = \left( \frac{ErrTlp_{len} + NAK_{len} + Block_{len} + 2}{TLP_{len} + H_{len} + PreIpg} \right) + 1,$$

where $ErrTlp_{len}$ is used to indicate a length of the first packet of the sequence number 21, $NAK_{len}$ is used to indicate a length of a NACK, $T_{phy}$ is used to indicate a transmission delay of a service passing through an interface, $T_{link}$ is used to indicate a transmission delay of a service in a physical medium such as a fiber or a copper wire, $R_{link}$ is used to indicate a bit rate of a link per second, $U_{linkutilization}$ is used to indicate link utilization, $TLP_{len}$ is used to indicate a payload length of the first packet, to be specific, a maximum payload length of the first packet, $H_{len}$ is used to indicate a header length of the first packet, 1 is used to indicate that the first packet of the sequence number 21 also needs to be retransmitted, and $Block_{len}$ is used to indicate a blocked length of the NACK.

According to the method provided in Embodiment 1, for example, $ErrTlp_{len}$=256 bytes, $NAK_{len}$=8 bytes, $T_{phy}$=30 nanoseconds, $T_{link}$=1 ns, for example, a transmission delay of a fiber of 2 m, $R_{link}$=100 Gbps, $U_{linkutilization}$=0.9, $TLP_{len}$=256 bytes, and $H_{len}$=20 bytes. For example, each ethernet frame may have eight preambles and an average frame spacing of 12 bytes, and therefore, PreIpg=8+12=20 bytes. According to the method provided in Embodiment 1, if the receive end currently is not sending the second packet when feeding back a NACK bit block, in other words, in a best case, $Block_{len}$=0, and $TLP_{eachreplay}$=4.248. If the receive end is currently sending the second packet when feeding back a NACK bit block, in other words, in a worst case, $Block_{len}$=8 bytes, and $TLP_{eachreplay}$=4.275.

It can be learned from the foregoing descriptions that according to the method provided in this embodiment of this application, the following problem can be avoided: Because the transmit end does not receive a NACK bit block in a timely manner, a quantity of first packets retransmitted by the transmit end is excessively large.

When this embodiment of this application is applied, a buffer size of the replay buffer of the transmit end may meet the following formula:

$$B_{ideal} = \left[ 2 \times (LinkLen \times 5 + T_{mac-phy}) + \frac{PktSize}{LinkRate} + \frac{BlockSize}{LinkRate} \right] \times LinkRate/8 + 2 \times BlockSize,$$

where LinkLen is used to indicate a link length, for example, 2 m, $T_{mac-phy}$ is used to indicate a processing delay from MAC to PHY, for example, 100 ns, PktSize is used to indicate a maximum payload length of the first packet sent by the transmit end, for example, 256 bytes, LinkRate is used to indicate a link rate, for example, 100 Gbps, and BlockSize is used to indicate a length of the at least one first bit block, for example, 8 bytes. Based on the foregoing formula, the buffer size of the replay buffer may be 3029 bytes.

It may be understood that the foregoing formula or the descriptions of the formula are also applicable to Embodiment 2 to Embodiment 4 shown below, and details are not described below to avoid repetition.

Embodiment 2

At least one first bit block includes a non-packet start bit block and a non-packet end bit block, and a preset field in the non-packet start bit block carries a first value.

In this embodiment of this application, a first type field, a first sequence field, and a CRC field may be located at bit positions 10 to 65 in the non-packet start bit block and bit positions 10 to 65 in the non-packet end bit block. The first type field, the first sequence field, and the CRC field may be located at different bit positions. In other words, bits occupied by the three fields do not overlap each other.

Figure 9A:
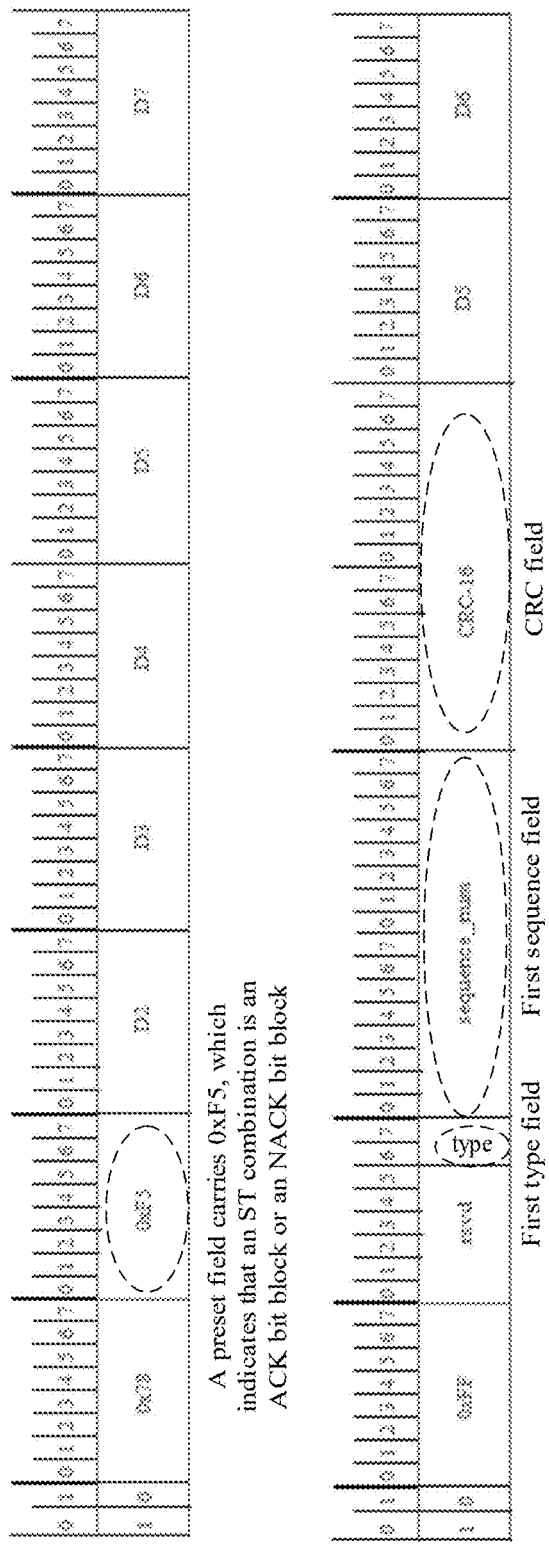
FIG. 9A and FIG. 9B are schematic diagrams of a format of at least one first bit block according to an embodiment of this application.

For example, bit positions of the first type field, the first sequence field, and the CRC field may be shown in FIG. 9A. To be specific, the first type field may be located at 2 bits at bit positions 16 and 17 in the non-packet end bit block, the first sequence field may be located at 16 bits at bit positions 18 to 33 in the non-packet end bit block, and the CRC field may be located at 16 bits at bit positions 34 to 49 in the non-packet end bit block.

Figure 9B:
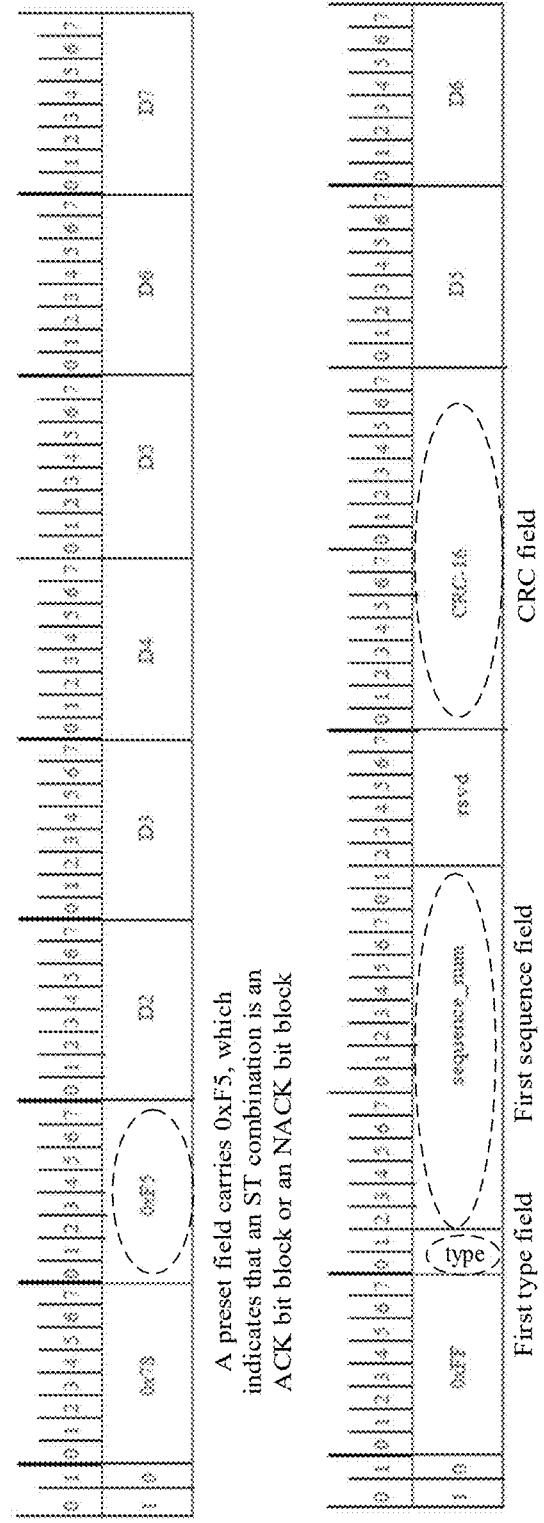

For example, FIG. 9B is a schematic diagram of a format of another non-packet end bit block according to an embodiment of this application. For the format shown in FIG. 9B, refer to the descriptions of FIG. 9A. Details are not described herein again. For example, Table 5 shows values and specific meanings of different fields in an S bit block and a T bit block. It may be understood that for specific descriptions of Table 5, refer to the foregoing descriptions. Details are not described herein again.

TABLE 5

| Bit block name | S bit block and T bit block |
| --- | --- |
| Position of a preset field | D1 area of S0 |
| Value of the preset field | 0xF5 |
| Position of the first type field | 2 bits in a D0 area of T7 |
| Value of the first type field | 2b01: a NACK bit block |
| Value of the first type field | 2b10: an ACK bit block |

Figure 8A:
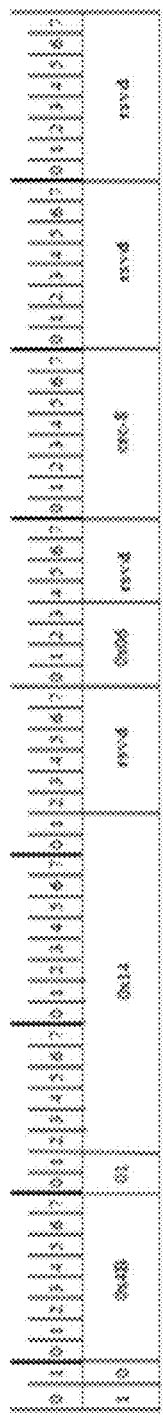
FIG. 8A is a schematic diagram of a format of an O bit block according to an embodiment of this application.
Figure 8B:
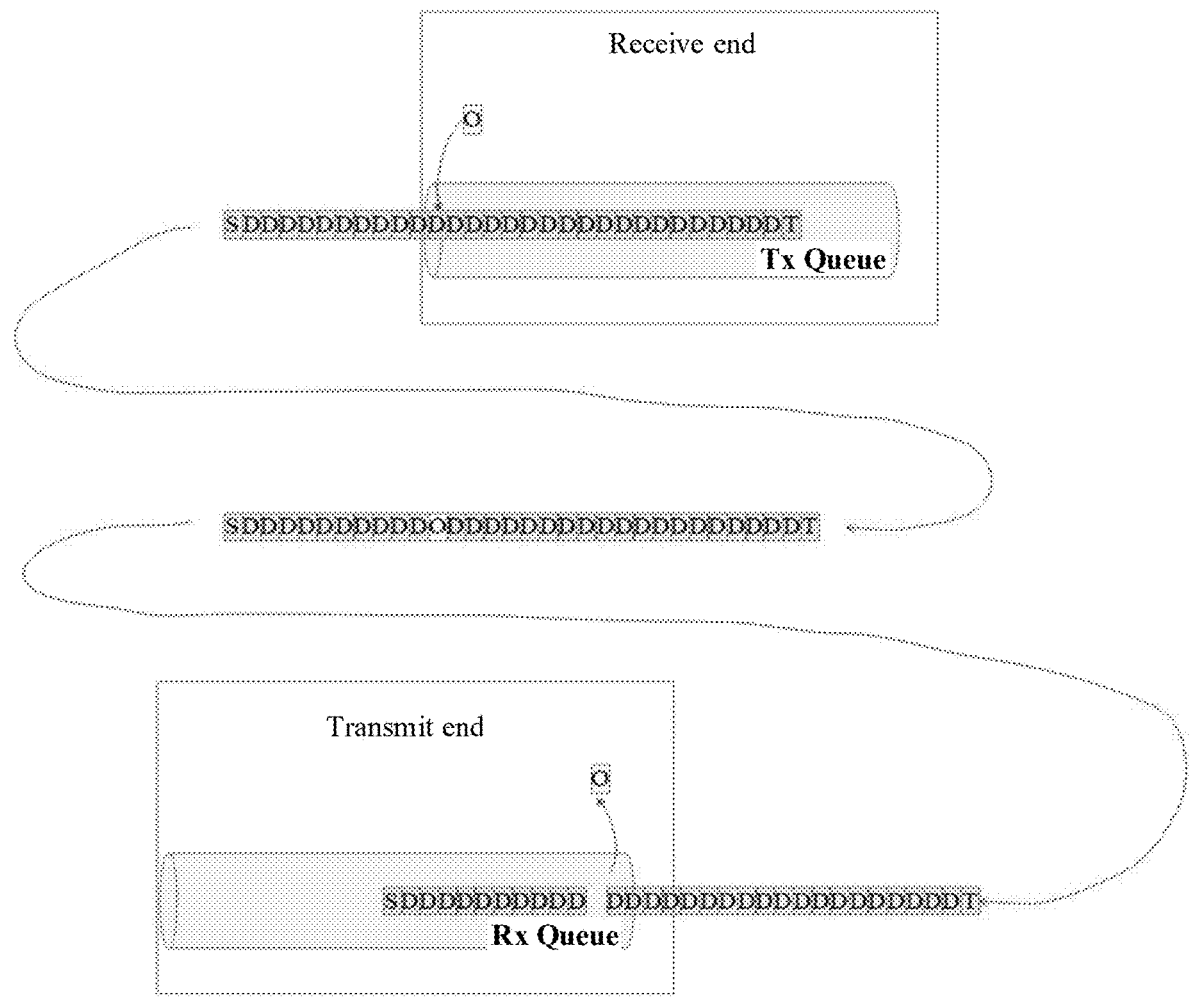
FIG. 8B is a schematic diagram of transmission of an O bit block according to an embodiment of this application.
Figure 9C:
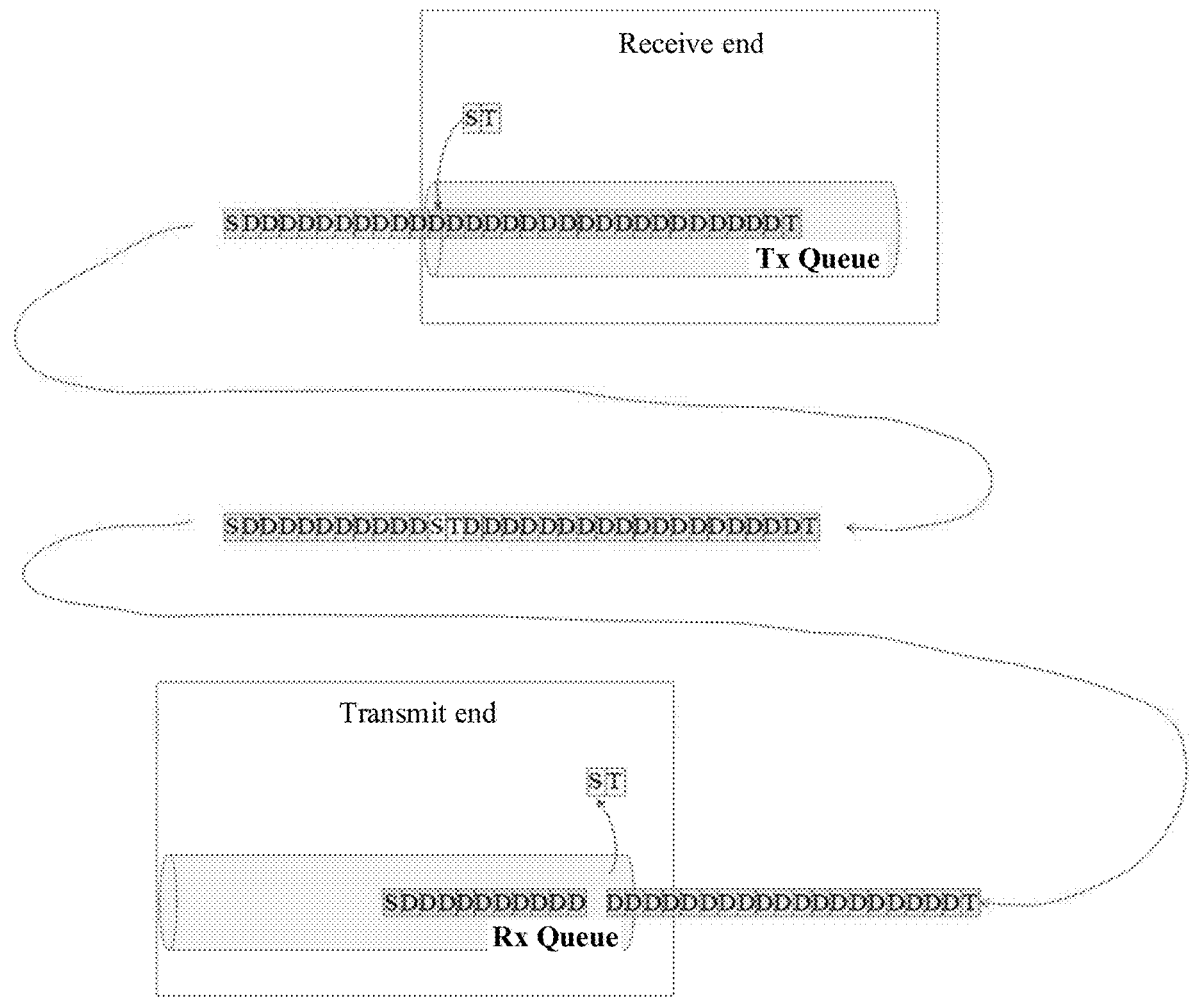
FIG. 9C and FIG. 9D are schematic diagrams of transmission of a non-packet start bit block and a non-packet end bit block according to an embodiment of this application.

Related descriptions of FIG. 8B are still used as an example. As shown in FIG. 9C, a receive end needs to perform feedback for an incorrectly received first packet of a sequence number 21, and the receive end is currently sending a packet bit block stream of a second packet. In this case, the receive end may insert a non-packet start bit block and a non-packet end bit block into the packet bit block stream currently being sent. Therefore, after obtaining the non-packet start bit block (for example, a block type field is 0x78), a transmit end may learn, based on 0xF5 carried in a preset field in the non-packet start bit block, that the non-packet start bit block is not a packet start bit block. In addition, after obtaining the non-packet end bit block, the transmit end obtains first sequence information, namely, a sequence number, from a first sequence field of the non-packet end bit block, and learns, based on a value carried in a first type field, that a feedback type of the non-packet start bit block and the non-packet end bit block is a NACK bit block. Then the transmit end learns that the first packet of the sequence number 21 and a first packet of a sequence number after the sequence number 21 are incorrectly received and need to be retransmitted.

Figure 9D:
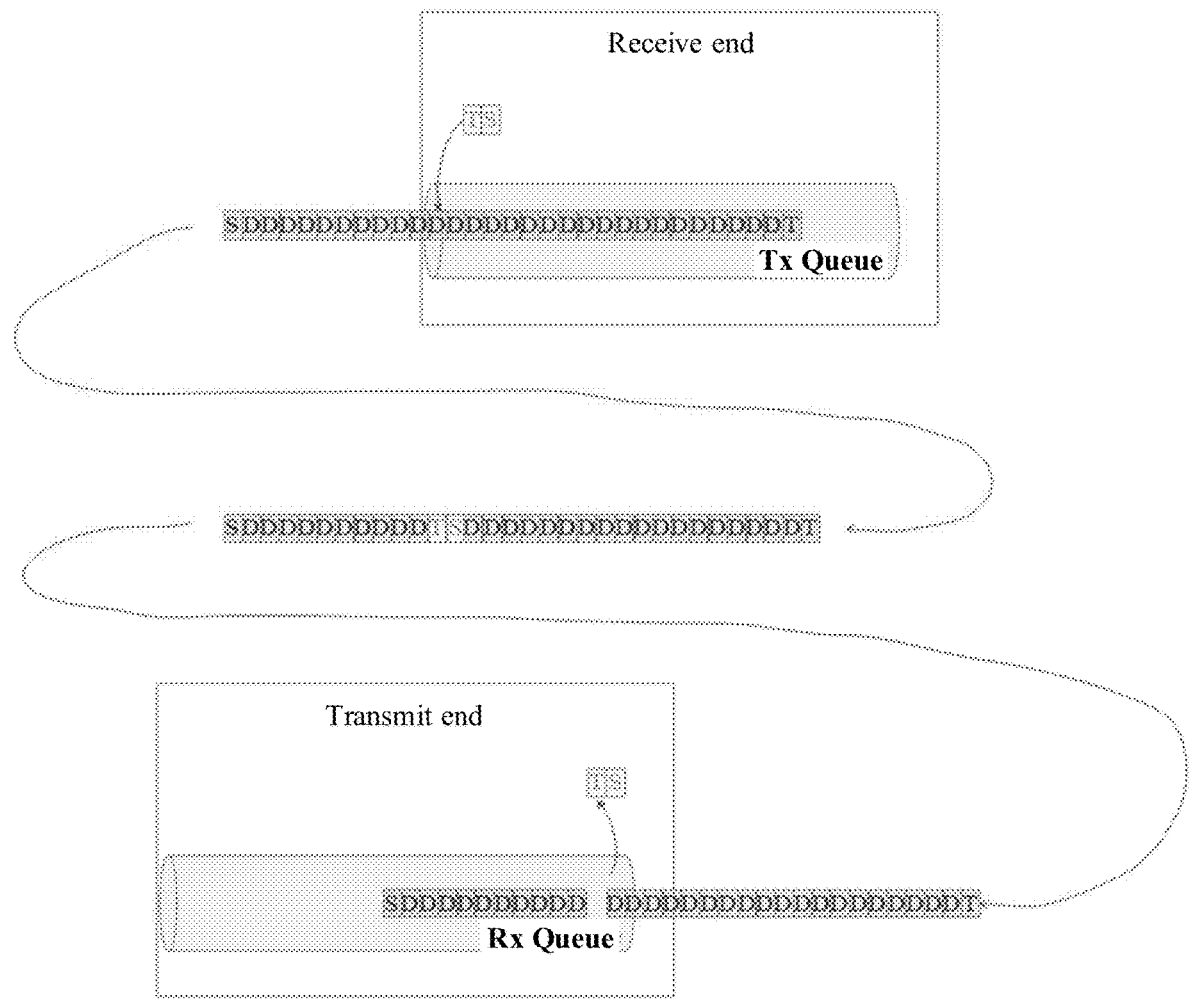

Optionally, as shown in FIG. 9C, the receive end sequentially inserts the non-packet start bit block and the non-packet end bit block into the packet bit block stream of the second packet. As shown in FIG. 9D, the receive end may alternatively sequentially insert the non-packet end bit block and the non-packet start bit block into the packet bit block stream of the second packet. In other words, in this embodiment of this application, the receive end may sequentially send the non-packet start bit block and the non-packet end bit block, or the receive end may sequentially send the non-packet end bit block and the non-packet start bit block.

Embodiment 3

At least one first bit block includes a non-packet start bit block, at least one non-packet data bit block corresponding to the non-packet start bit block, and a non-packet end bit block corresponding to the non-packet start bit block, and a preset field in the non-packet start bit block carries a first value.

In this embodiment of this application, a first type field, a first sequence field, and a CRC field may be separately located in the non-packet data bit block, and occupy different bit positions.

For example, the at least one first bit block may include one non-packet start bit block, one non-packet data bit block, and one non-packet end bit block. The first type field, the first sequence field, and the CRC field may be included in the non-packet data bit block. Specific positions of the three fields are not limited in this embodiment of this application.

For example, the at least one first bit block may alternatively include one non-packet start bit block, at least two non-packet data bit blocks, and one non-packet end bit block. The first type field and the first sequence field may be included in a same non-packet data bit block, and the CRC field may be located in another non-packet data bit block.

Figure 10A:
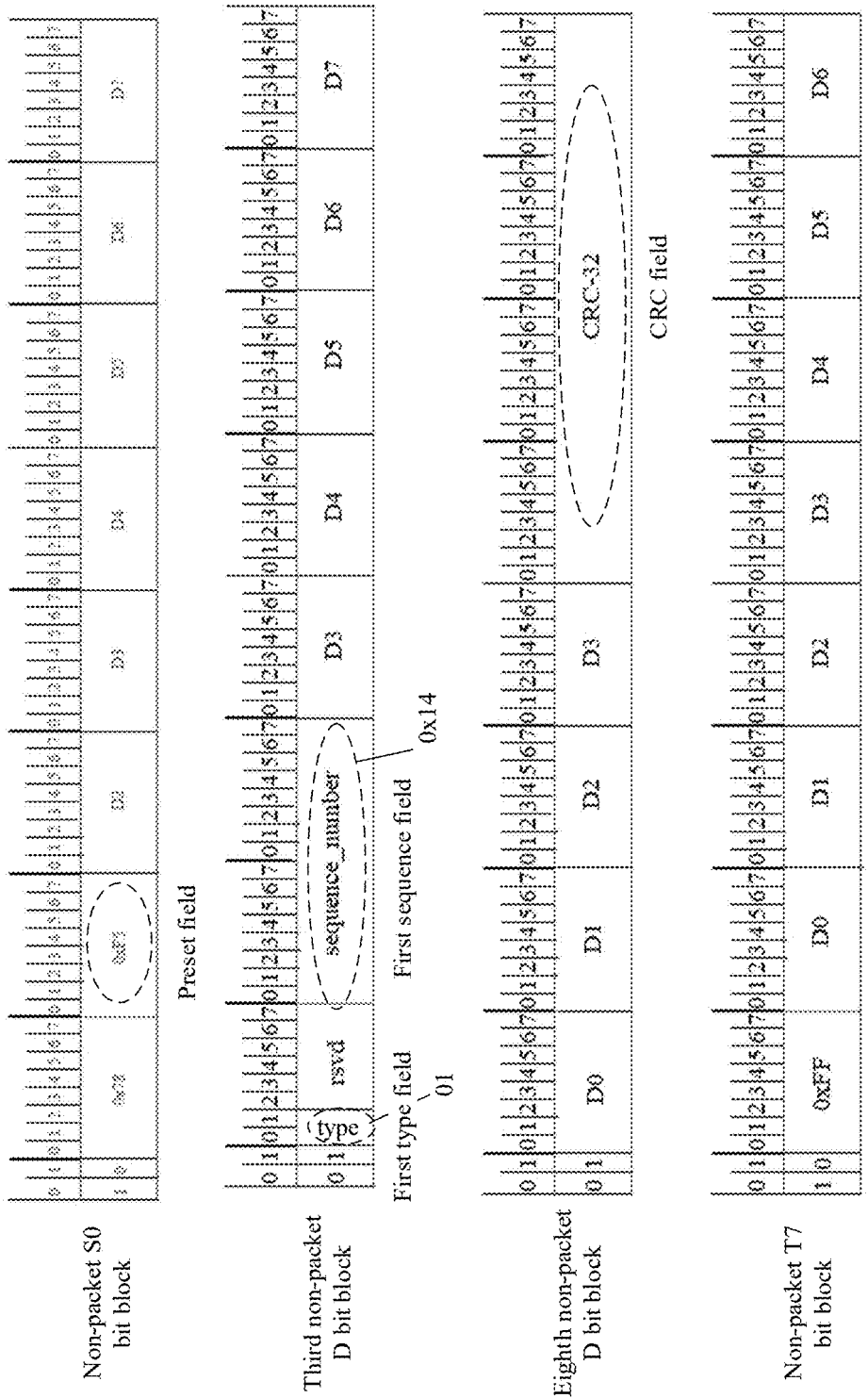
FIG. 10A is a schematic diagram of a format of at least one first bit block according to an embodiment of this application.

For example, the at least one first bit block may alternatively include one non-packet start bit block, eight non-packet data bit blocks, and one non-packet end bit block. The first type field and the first sequence field may be included in the third non-packet data bit block, and the CRC field may be included in the eighth non-packet data bit block. In this case, a format of the at least one first bit block may be shown in FIG. 10A. For specific descriptions of FIG. 10A, refer to other embodiments. Details are not described herein again.

Figure 10B:
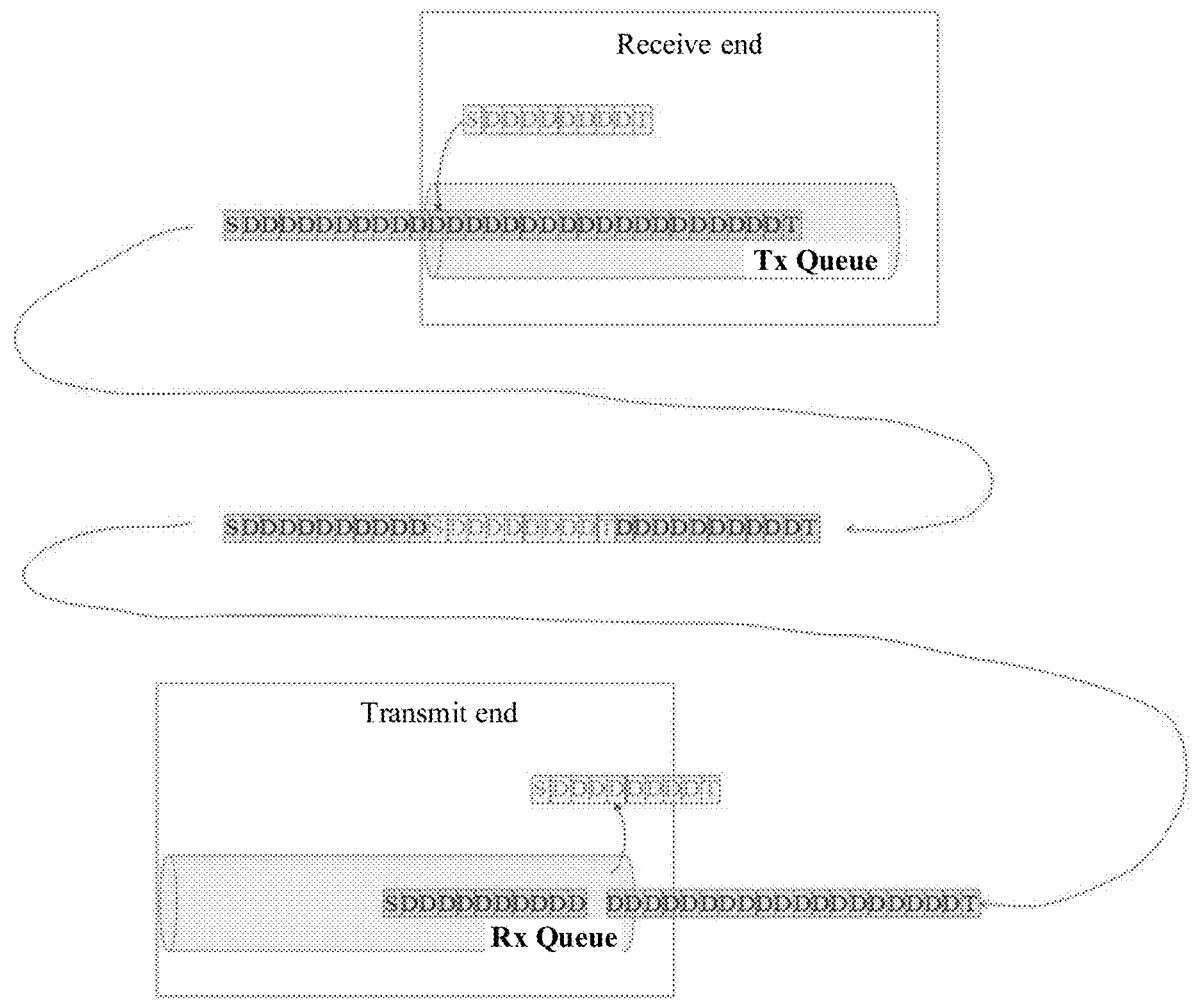
FIG. 10B is a schematic diagram of transmission of at least one first bit block according to an embodiment of this application.

Related descriptions of FIG. 8B are still used as an example. As shown in FIG. 10B, a receive end needs to feed back an incorrectly received first packet of a sequence number 21, and the receive end is currently sending a packet bit block stream of a second packet. In this case, the receive end may insert a non-packet start bit block, eight non-packet data bit blocks, and a non-packet end bit block into the packet bit block stream currently being sent. Therefore, after obtaining the non-packet start bit block, a transmit end may learn, based on 0xF5 carried in a preset field in the non-packet start bit block, that the non-packet start bit block is not a packet start bit block. In addition, after obtaining the eight non-packet data bit blocks, the transmit end obtains first sequence information, namely, a sequence number, from a first sequence field of the eight non-packet data bit blocks, and learns, based on a value carried in a first type field, that a feedback type is a NACK bit block. Then the transmit end learns that the first packet of the sequence number 21 and a first packet of a sequence number after the sequence number 21 are incorrectly received and need to be retransmitted.

It may be understood that for the method shown in FIG. 10B, refer to specific descriptions in Embodiment 1 and Embodiment 2. Details are not described herein again.

Embodiment 4

At least one first bit block includes at least one O bit block, and a preset field in each O bit block carries a second value.

Embodiment 1 to Embodiment 3 shown above are shown by using bit blocks shown in FIG. 3A as an example. In this embodiment of this application, bit blocks shown in FIG. 3B are used as an example to describe the method provided in this embodiment of this application.

Figure 11A:
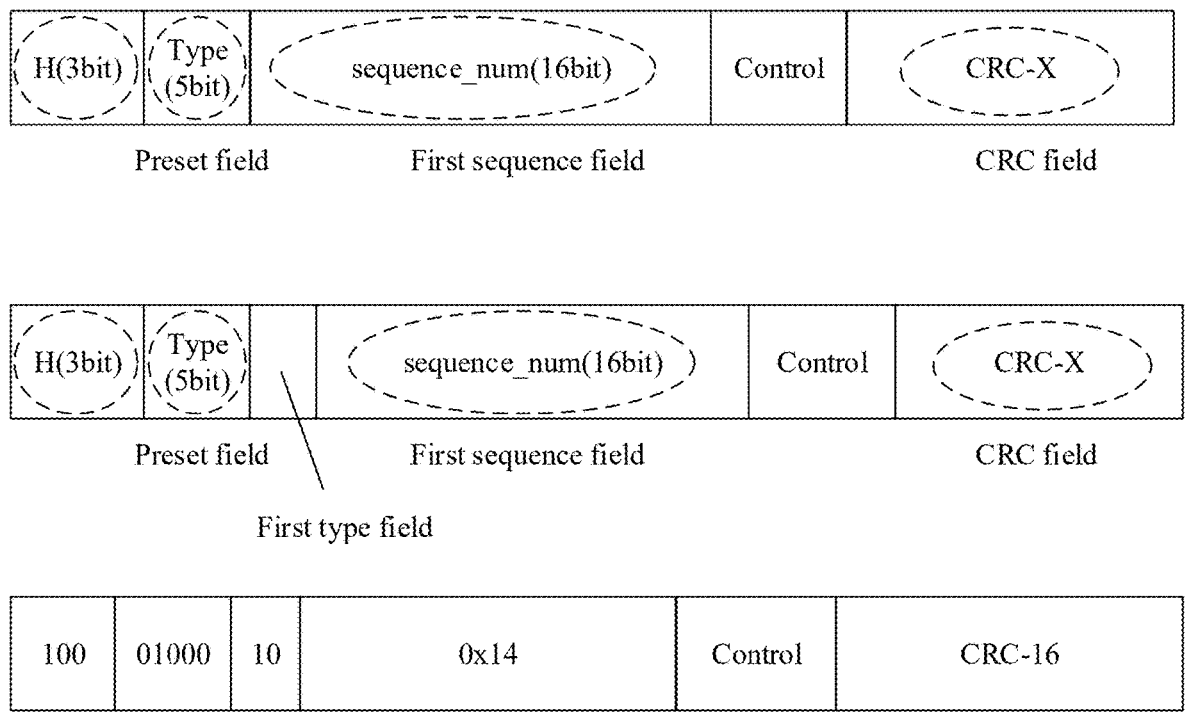
FIG. 11A is a schematic diagram of a format of at least one first bit block according to an embodiment of this application.

For example, as shown in the first graph in FIG. 11A, a length of H may be 3 bits. When H carries 100, it indicates that the flit is a control flit; or when H carries 001, it indicates that the flit is a payload flit. A length of a preset field is 5 bits. When the preset field carries 00001, it indicates that a type of the flit is a packet start bit block; or when the preset field carries 00010, it indicates that a type of the flit is an ACK flit; or when the preset field carries 00100, it indicates that a type of the flit is a NACK flit. In other words, when H carries 100 and the preset field carries 00010, the flit is an ACK flit; or when H carries 100 and the preset field carries 00100, the flit is a NACK flit.

For example, as shown in the second graph and the third graph in FIG. 11A, a length of a preset field is still 5 bits. When the preset field carries 01000, it indicates that a type of the flit is an O flit. Then a first type field is used to represent a specific type of the flit. For example, a length of the first type field is 2 bits; and when the first type field carries 01, it indicates that the O flit is an ACK flit; or when the first type field carries 10, it indicates that the O flit is a NACK flit.

Figure 11B:
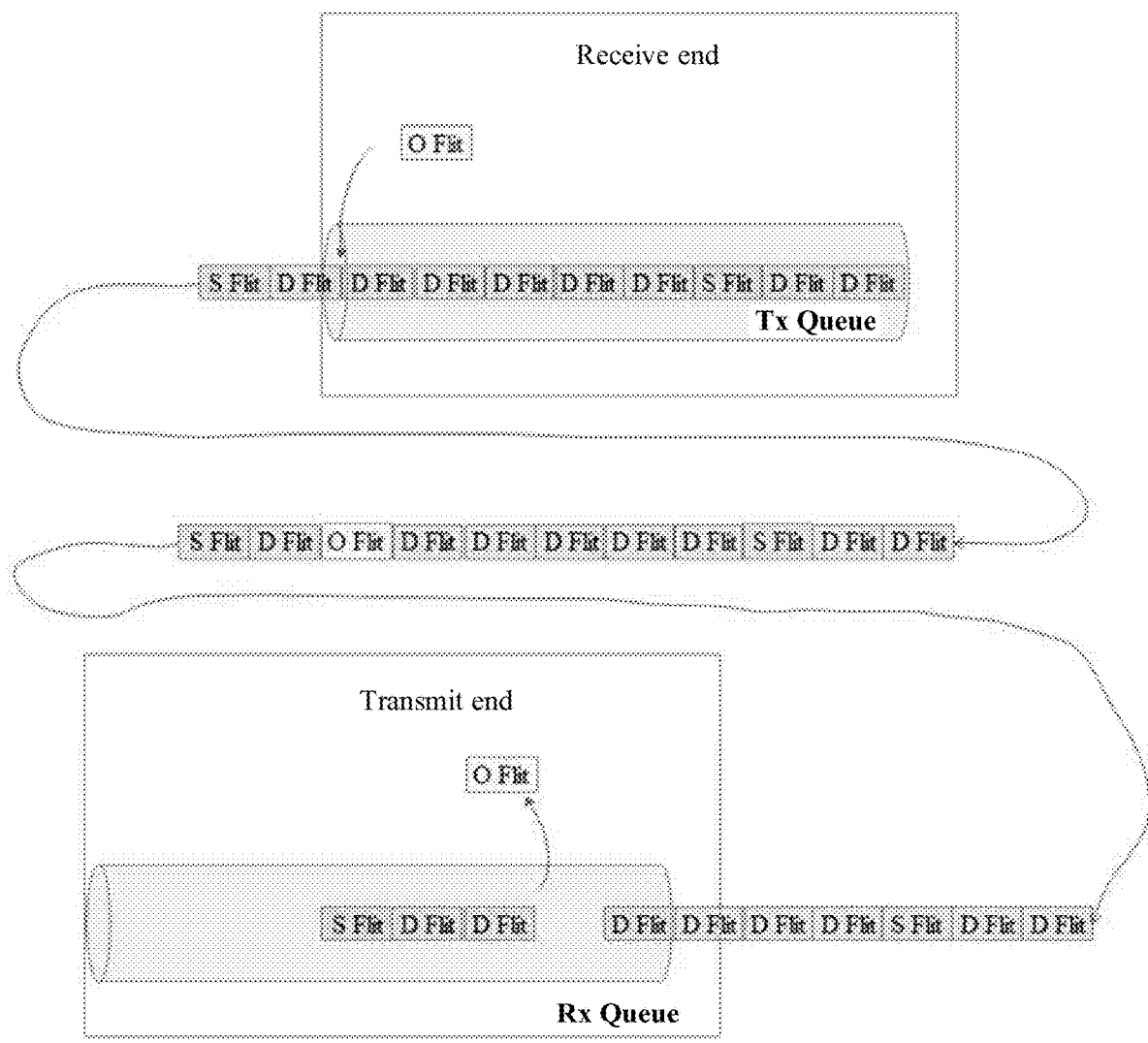
FIG. 11B is a schematic diagram of transmission of at least one first bit block according to an embodiment of this application.

Related descriptions of FIG. 8A are still used as an example. As shown in the third graph in FIG. 11A, and as shown in FIG. 11B, a receive end may insert the at least one first bit block into a bit block stream, and send the at least one first bit block to a transmit end. It may be understood that an O flit shown in FIG. 11B is the at least one first bit block shown in this embodiment of this application. It may be understood that for specific descriptions of FIG. 11A and FIG. 11B, refer to the foregoing embodiments. Details are not described herein again.

It may be understood that a synchronization header (for example, an H field in FIG. 11A) in an S flit (for example, a packet start bit block) shown in FIG. 11B carries 100, and a synchronization header of a data (D) flit carries 001. Compared with a solution in which only an S flit includes a synchronization header and a D flit does not include a synchronization header, in this embodiment of this application, each flit includes a synchronization header, so that it is ensured that the transmit end can identify the at least one first bit block from the D flit even if the at least one first bit block is inserted into a bit block stream of the flit. For example, if the D flit does not include a synchronization header, and values of some fields in the D flit are just the same as those of the O flit, the transmit end may be unable to identify whether a received flit is a D flit or an O flit.

The following describes in detail specific embodiments in which a packet sent by a communication apparatus includes or does not include a sequence field. For example, a first packet sent by a transmit end includes or does not include a third sequence field, or a second packet sent by a receive end includes or does not include a second sequence field. It may be understood that Embodiment 5 described below is shown by using an example in which a packet (including a first packet and a second packet) includes a sequence field, and Embodiment 5 further shows a relationship between a packet and an ACK or a NACK that is fed back. Embodiment 6 and Embodiment 7 described below are shown by using an example in which a packet does not include a sequence field.

Embodiment 5

Figure 7A:
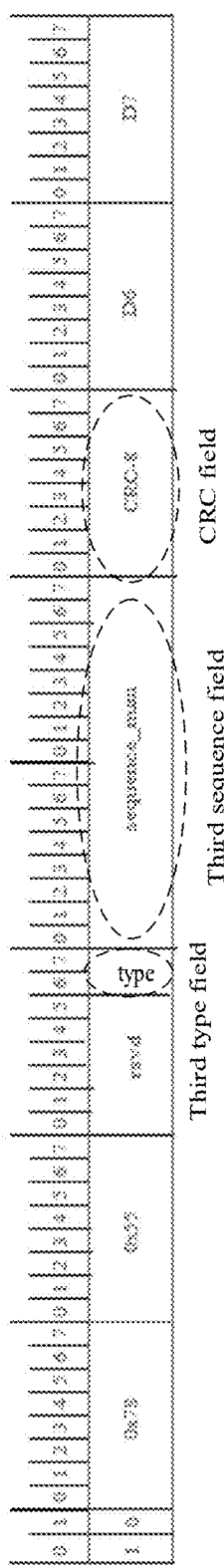
FIG. 7A and FIG. 7B are schematic diagrams of a format of a first packet according to an embodiment of this application.
Figure 7B:
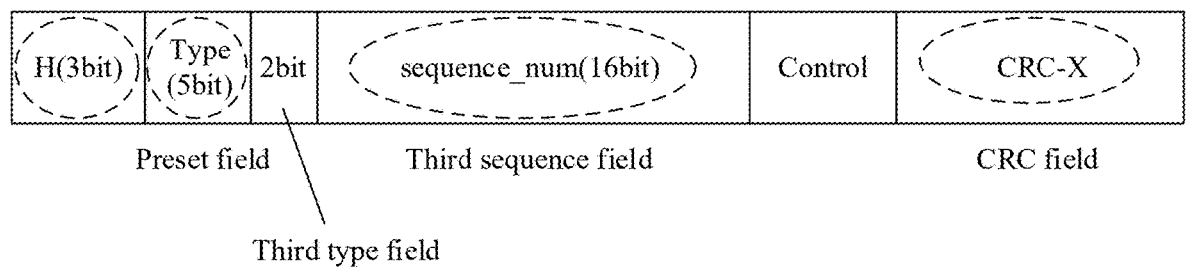
Figure 12A:
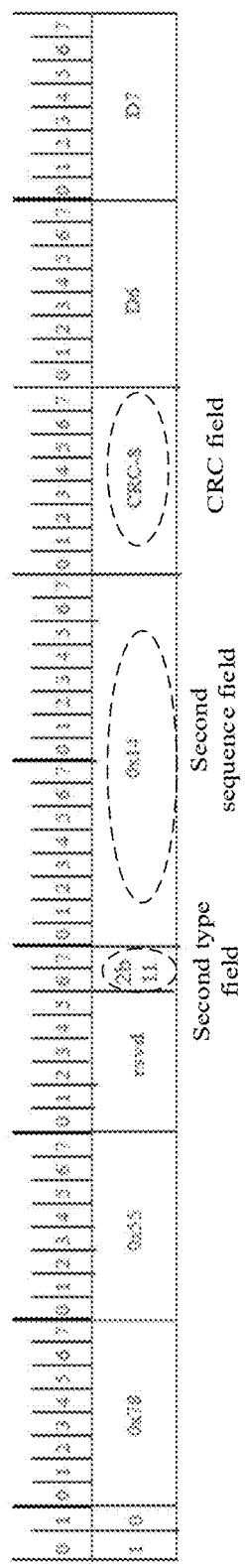
FIG. 12A is a schematic diagram of a packet format according to an embodiment of this application.
Figure 12B:
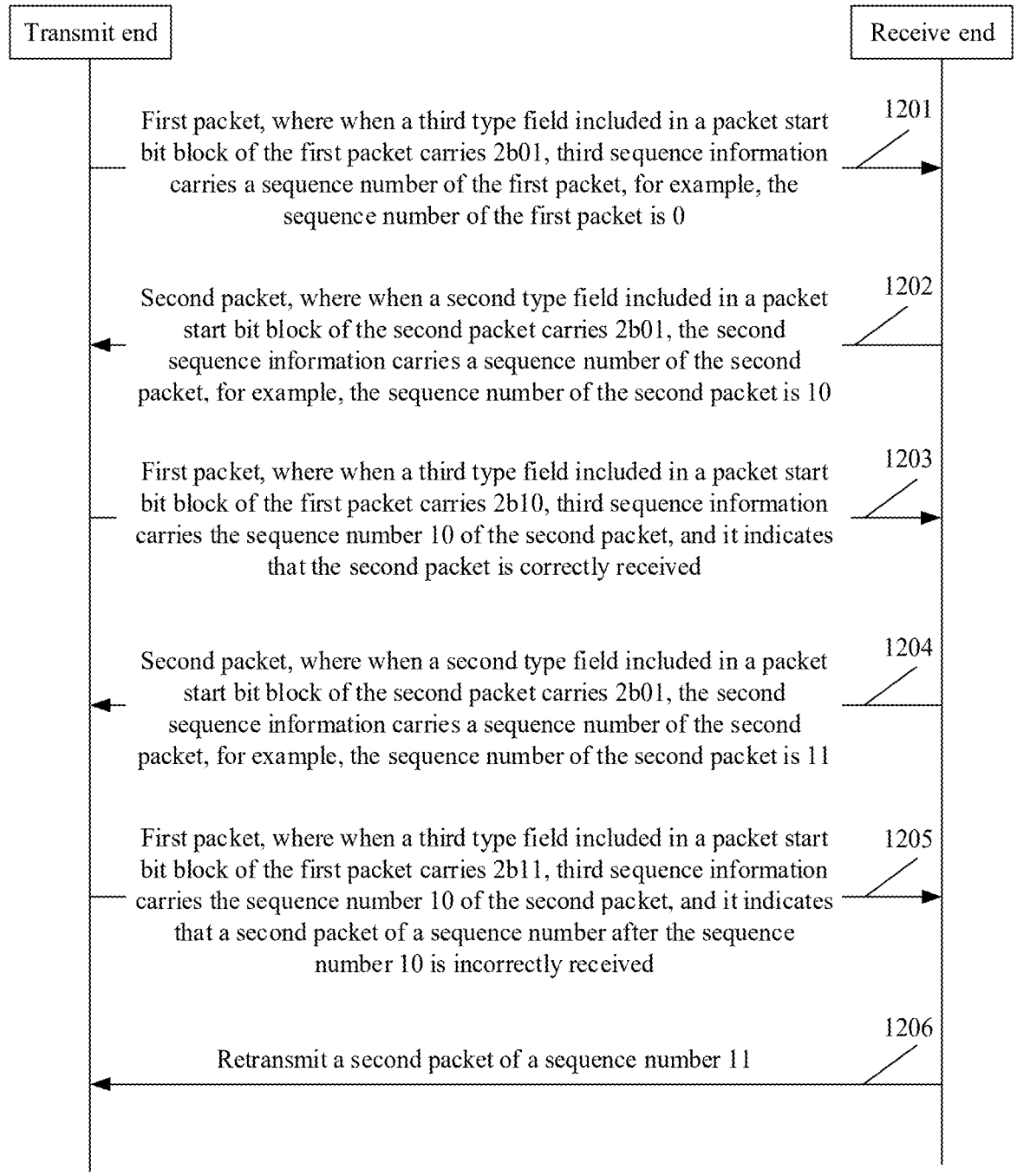
FIG. 12B is a schematic flowchart of a retransmission method according to an embodiment of this application.

Before FIG. 12B is described, specific meanings of sequence fields (which are merely collective terms) in FIG. 7A and FIG. 7B are first described. FIG. 7A is a schematic diagram of a format of a packet bit block.

In this embodiment of this application, a communication apparatus may add a sequence field to D3 and D4 areas of S0, and add a type (type) field to 2 bits (bit) of D2. It may be understood that, for a transmit end, a third sequence field in a first packet sent by the transmit end may be located in D3 and D4 areas of S0 of the first packet, and a third type field in the first packet may be located in a D2 area of S0 of the first packet. For a receive end, a second sequence field in a second packet sent by the receive end is located in D3 and D4 areas of S0 of the second packet, and a second type field in the second packet may be located in a D2 area of S0 of the second packet.

In this embodiment of this application, although field names in the first packet and in the second packet are different, for a packet, a third type field and a second type field are located in a same area, and a third sequence field and a second sequence field are also located in a same area. Therefore, for ease of description, the second sequence field and the third sequence field are collectively referred to as a sequence field in the packet below, and the second type field and the third type field are collectively referred to as a type field in the packet below. The sequence field in the packet may be used to carry sequence information, the type field in the packet may carry different values, and there is a correspondence between the type field in the packet and the sequence information.

For example, as shown in Table 3, when the type field in the packet carries 2b01 (in other words, a value of the type field is 2b01), it indicates that the sequence information in the packet is a sequence number of the current packet. For another example, if the type field in the packet carries 2b10, it indicates that the sequence information in the packet is a sequence number of an ACK. For another example, if the type field in the packet carries 2b11, it indicates that the sequence information in the packet is a sequence number of a NACK. The sequence number of the ACK herein indicates that the communication apparatus feeds back a sequence number of the last correctly received packet, and the sequence number of the NACK indicates that the communication apparatus feeds back the sequence number of the last correctly received packet but a packet after the last correctly received packet is incorrectly received. For a relationship between an ACK or a NACK and a sequence number, refer to the foregoing descriptions. Details are not described in this embodiment of this application. It may be understood that the description is also applicable to the following descriptions.

In some implementations, with reference to the methods shown in FIG. 6 to FIG. 10B, when the transmit end sends a first packet, a value of a third type field carried by 2 bits at bit positions 16 and 17 in a packet start bit block of the first packet is 2b01 (namely, a fourth value). In addition, 16 bits at bit positions 18 to 33 in the packet start bit block of the first packet may be used to carry a sequence number of the first packet. When the receive end sends a second packet, a value of a second type field carried by 2 bits at bit positions 16 and 17 in the packet start bit block of the second packet is 2b01 (namely, the fourth value), and in addition, 16 bits at bit positions 18 to 33 in the packet start bit block of the second packet may be used to carry a sequence number of the second packet.

In other implementations, when the receive end feeds back, to the transmit end, whether at least one first packet is correctly received, the receive end may send a second packet, but the second packet has not been sent. In this case, the receive end may feed back, in the second packet, whether the at least one first packet is correctly received. For example, a value of a second type field carried by 2 bits at bit positions 16 and 17 in a start bit block of the second packet is 2b10 or 2b11 (namely, a fifth value). A specific value may be determined depending on whether the receive end correctly receives the first packet. For example, in the example of Embodiment 1 to Embodiment 4, a format of the second packet may be shown in FIG. 12A.

FIG. 7B is a schematic diagram of a format of another packet bit block. In this embodiment of this application, a packet start flit may be used to carry a sequence field and a type field. As shown in FIG. 7B, a packet start flit of a packet may include a 2-bit type field and a 16-bit sequence field (merely as examples). The sequence field may be used to carry sequence information, and the type field may also carry different values. For example, if the type field carries 2b01 (namely, the fourth value), it indicates that the sequence information is a sequence number of the current packet; or if the type field carries 2b10 (namely, the fifth value), it indicates that the sequence information is a sequence number of an ACK; or if the type field carries 2b11 (namely, the fifth value), it indicates that the sequence information is a sequence number of a NACK. It may be understood that for specific descriptions of FIG. 7B, further refer to the descriptions of FIG. 7A. Details are not described herein again.

It may be understood that specific positions of the fields shown in FIG. 7A and FIG. 7B are merely examples. During specific implementation, the foregoing fields may be alternatively at other positions. For example, 2 bits at bit positions 10 and 11 in the packet start bit block of the first packet may be alternatively used to carry the third type field. For another example, D4 and D5 of the packet start bit block of the first packet may be alternatively used to carry the third sequence field. In addition, lengths and specific values of the fields shown above are not limited in this embodiment of this application. The lengths of the foregoing fields may be further determined based on a length of a packet bit block included in the first packet.

FIG. 12B is a schematic flowchart of a retransmission method according to an embodiment of this application. In the retransmission method shown in this embodiment of this application, a packet sent by a communication apparatus may include a sequence number of the packet, or another packet sent by the communication apparatus may include a sequence number of an ACK, or still another packet sent by the communication apparatus may include a sequence number of a NACK. As shown in FIG. 12B, the retransmission method may include the following steps.

1201: A transmit end sends a first packet to a receive end. When a third type field included in a packet start bit block of the first packet carries 2b01, third sequence information carries a sequence number of the first packet. For example, the sequence number of the first packet is 0. Correspondingly, the receive end receives the first packet.

1202: The transmit end receives a second packet sent by the receive end. When a second type field included in a packet start bit block of the second packet carries 2b01, second sequence information carries a sequence number of the second packet. For example, the sequence number of the second packet is 10.

1203: The transmit end sends a first packet to the receive end. In this case, the transmit end further needs to feed back whether the second packet is correctly received. In this case, when a third type field included in a packet start bit block of the first packet carries 2b10, third sequence information carries the sequence number 10 of the second packet, and it indicates that the second packet of the sequence number 10 is correctly received. Correspondingly, the receive end receives the first packet.

In this embodiment of this application, although the third sequence information fed back in the first packet in step 1203 is the sequence number 10 of the second packet, after receiving the first packet, the receive end may further learn, based on a locally maintained sequence number, that a sequence number of the first packet is 1. Therefore, the receive end may also feed back, based on the learned sequence number 1 of the first packet, whether the first packet is correctly received. For specific descriptions of feedback, refer to the descriptions in which the transmit end feeds back an ACK or a NACK to the receive end. Details are not described herein again.

1204: The transmit end receives a second packet sent by the receive end. When a second type field included in a packet start bit block of the second packet carries 2b01, second sequence information carries a sequence number of the second packet. For example, the sequence number of the second packet is 11.

1205: The transmit end sends a first packet to the receive end. In this case, the transmit end further needs to feed back whether the second packet is correctly received. In this case, when a third type field included in a packet start bit block of the first packet carries 2b11, third sequence information carries the sequence number 10 of the second packet, and it indicates that the second packet of the sequence number 10 is correctly received but a second packet of a sequence number after the sequence number 10 is incorrectly received. Correspondingly, the receive end receives the first packet.

1206: The receive end retransmits a second packet of a sequence number 11, and correspondingly, the transmit end receives the second packet of the sequence number 11.

In this embodiment of this application, when the receive end retransmits the second packet of the sequence number 11, if the receive end also needs to feed back whether the first packet is correctly received, an ACK or a NACK may also be fed back in a packet start bit block of the retransmitted second packet of the sequence number 11.

Optionally, to enable the transmit end to clearly learn whether the received second packet is a newly transmitted packet or a retransmitted packet, before the receive end retransmits the second packet of the sequence number 11, the receive end may further send at least one O bit block (for example, one O bit block, two O bit blocks, or three O bit blocks) to the transmit end, and a first type field of the O bit block carries 2b11. For this implementation, further refer to Table 4. Details are not described herein again.

In this embodiment of this application, the transmit end not only sends the first packet to the receive end, but also feeds back, to the receive end by using the first packet, whether the second packet is correctly received, so that an ACK or a NACK is sent in a timely manner, and network utilization is further improved.

Figure 12C:
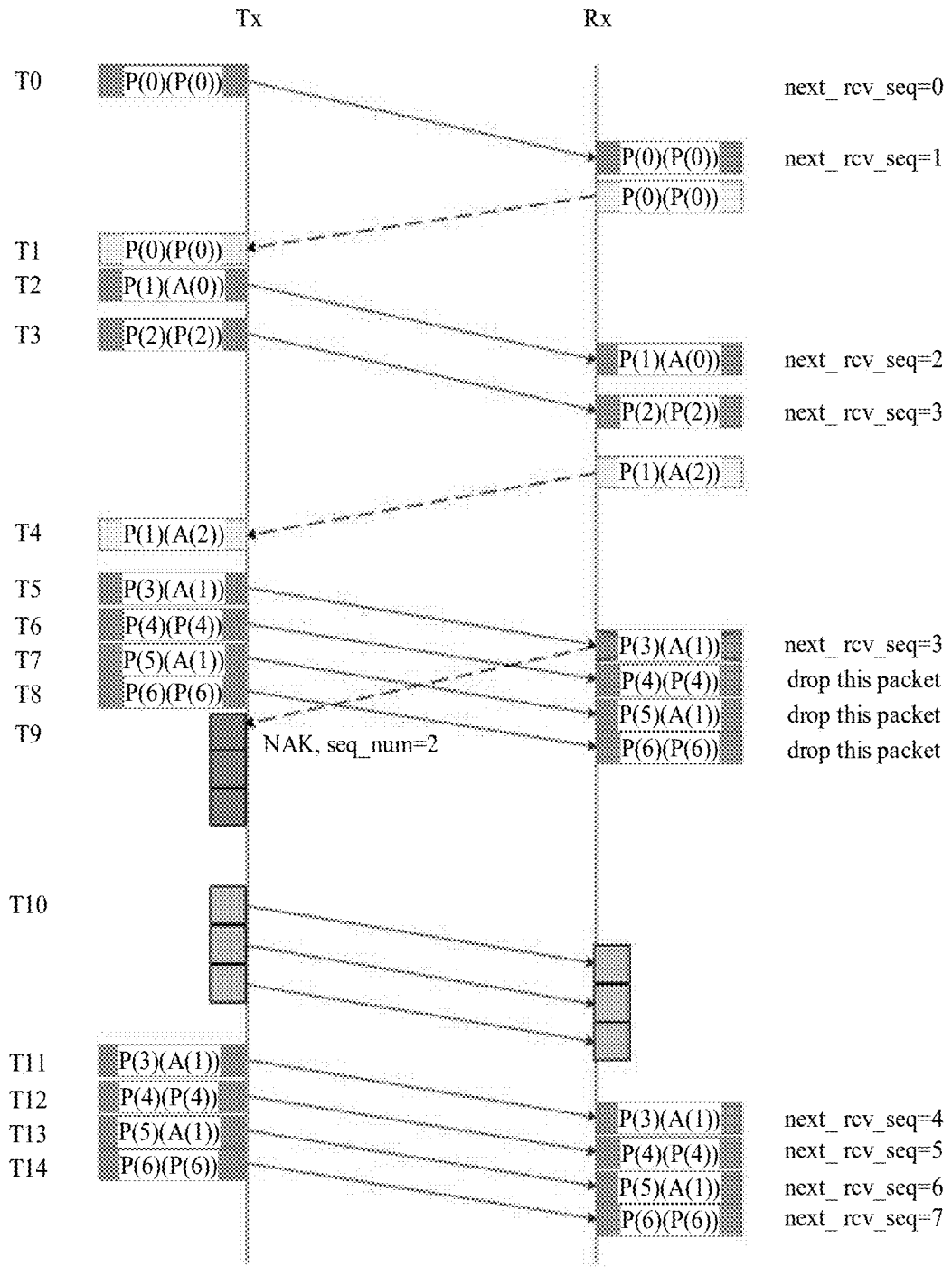
FIG. 12C to FIG. 12E are schematic diagrams of a specific scenario of a retransmission method according to an embodiment of this application.

To further understand the method shown in FIG. 12B, as shown in FIG. 12C, an embodiment of this application further provides a retransmission method. In FIG. 12C, a transmit end is referred to as Tx, and a receive end is referred to as Rx. P(m)P(m) indicates that a communication apparatus transmits a packet of a sequence number P(m) and the packet includes the sequence number P(m) of the current packet. P(m)A(n) indicates that the communication apparatus transmits a packet of a sequence number P(m) but the packet includes a sequence number of an ACK that is fed back, in other words, a case in which a packet of a sequence number n is correctly received is fed back in the packet that is of the sequence number P(m) and that is transmitted by the communication apparatus. As shown in FIG. 12C, at a moment T0, the transmit end sends a first packet to the receive end. A third type field carries 2b01, indicating that a third sequence field in the first packet carries a sequence number (sequence_num), for example, 0, of the first packet.

At a moment T1, the transmit end sends a first packet of a sequence number 1 to the receive end, and the transmit end also receives a second packet sent by the receive end. A sequence number of the second packet is 0. In this case, if the transmit end correctly receives the second packet of the sequence number 0, the transmit end needs to feed back an ACK. Therefore, the transmit end may feed back, to the receive end by using the first packet of the sequence number 1, a case in which the second packet of the sequence number 0 is correctly received. For example, the transmit end may set a value of a third type field of the first packet of the sequence number 1 to 2b10, and a third sequence field carries 0. In other words, although the first packet sent by the transmit end includes third sequence information, the third sequence information does not indicate the sequence number of the first packet sent by the transmit end, but indicates the sequence number of the second packet correctly received by the transmit end. In this case, after receiving the first packet, the receive end may learn of the sequence number of the first packet based on a locally maintained sequence number (for example, next_rcv_seq in FIG. 12C).

At a moment T2, the transmit end sends a first packet of a sequence number 2 to the receive end. A third type field in the first packet carries 2b01, indicating that a third sequence field carries the sequence number 2 of the first packet.

At a moment T3, the transmit end sends a first packet of a sequence number 3 to the receive end, and the transmit end also receives a second packet of a sequence number 1. In this case, if the transmit end correctly receives the second packet of the sequence number 1, the transmit end may feed back an ACK. Therefore, the transmit end may set a value of a third type field of the first packet of the sequence number 3 to 2b10, and a third sequence field carries the sequence number, for example, 1, of the second packet correctly received by the transmit end. In addition, the receive end receives the first packet, and checks CRC information of the first packet. If the CRC information of the first packet is unsuccessfully checked, the receive end may feed back a NACK bit block. For specific descriptions of the NACK bit block, refer to Embodiment 1 to Embodiment 4. Details are not described herein again.

At a moment T4, the transmit end sends a first packet of a sequence number 4 to the receive end. A third type field in the first packet carries 2b01, indicating that a third sequence field carries the sequence number 4 of the first packet.

At a moment T5, the transmit end sends a first packet of a sequence number 5 to the receive end. Assuming that the transmit end does not receive another second packet from the receive end (in other words, after the moment T3 and before the moment T5, the transmit end does not receive a second packet sent by the receive end), the transmit end still needs to feed back, to the receive end, a case in which the second packet of the sequence number 1 is correctly received. In other words, a third type field of the first packet of the sequence number 5 carries 2b10, indicating that a third sequence field carries the sequence number 1 of the second packet. When receiving the first packet, the receive end directly drops the first packet.

At a moment T6, the transmit end sends a first packet of a sequence number 6 to the receive end. A third type field carries 2b01, indicating that a third sequence field in the first packet carries a sequence_num, for example, 6, of the first packet. When receiving the first packet, the receive end directly drops the first packet.

At a moment T7, the transmit end receives a NACK bit block sent by the receive end. A first sequence field of the NACK bit block is 2, indicating that a first packet of a sequence number before the sequence number 2 is correctly received. It may be understood that for specific descriptions of the NACK bit block, refer to FIG. 6 to FIG. 10B. Details are not described herein again.

As shown in FIG. 12C, the receive end sends three same NACK bit blocks (NAK shown in FIG. 12C). For specific descriptions of each NACK bit block, refer to Embodiment 1 to Embodiment 4. Details are not described herein again. It may be understood that during specific implementation, the receive end may alternatively send only one NACK bit block, two NACK bit blocks, or the like. This is not limited in this embodiment of this application. The receive end sends a plurality of NACK bit blocks or ACK bit blocks, so that the transmit end can learn whether the receive end correctly receives a corresponding packet, provided that the transmit end correctly receives one NACK bit block or ACK bit block.

At a moment T8, the transmit end sends three O bit blocks. A first type field of each O bit block carries 2b11, indicating that a retransmitted first packet is transmitted after the O bit block.

At a moment T9, the transmit end retransmits the first packet of the sequence number 3. The third type field carries 2b10, and the third sequence field carries 1. When the receive end receives the first packet, and the CRC information of the first packet is successfully checked, the receive end updates the locally maintained sequence number (next_rcv_seq).

At a moment T10, the transmit end retransmits the first packet of the sequence number 4. The third type field in the first packet carries 2b01, indicating that the third sequence field carries the sequence number 4 of the first packet. When the receive end receives the first packet of the sequence number 4, and CRC information of the first packet is successfully checked, the receive end updates the locally next_rcv_seq.

At a moment T11, the transmit end retransmits the first packet of the sequence number 5. The third type field in the first packet carries 2b10, and the third sequence field carries 1. When the receive end receives the first packet, and CRC information of the first packet is successfully checked, the receive end updates the locally next_rcv_seq.

At a moment T12, the transmit end retransmits the first packet of the sequence number 6. The third type field in the first packet carries 2b01, indicating that the third sequence field in the first packet carries the sequence_num, for example, 6, of the first packet. When the receive end receives the first packet of the sequence number 6, and CRC information of the first packet is successfully checked, the receive end updates the next_rcv_seq.

It may be understood that for other descriptions of FIG. 12C, for example, the ACK bit block, the NACK bit block, and the third type field, refer to the other embodiments shown above.

Embodiment 6

A packet sent by a communication apparatus in Embodiment 5 shown above includes a sequence number of the current packet. However, alternatively, a packet sent by a communication apparatus in Embodiment 6 and Embodiment 7 may not include a sequence number of the current packet. In this case, after receiving the packet, the communication apparatus may learn of the sequence number of the received packet based on a locally maintained sequence number. For example, each time the communication apparatus receives a packet, the communication apparatus may update the locally maintained sequence number.

In this embodiment of this application, with reference to the methods shown in FIG. 6 to FIG. 10B, when a transmit end sends a first packet, a value of a third type field carried by 2 bits at bit positions 16 and 17 in a packet start bit block of the first packet is 2b01. Different from Embodiment 5, the packet start bit block of the first packet does not include a third sequence field. Correspondingly, a packet start bit block of a second packet does not include a second type field, either.

In this embodiment of this application, the communication apparatus may learn of a sequence number of each packet by maintaining a local replay buffer. For example, the transmit end may number packets in the replay buffer, for example, from 0 to N−1 (N is a size of the replay buffer), and the number is a packet sequence number maintained by the transmit end. When a link is in a fault/inactive state, next_rcv_seq is set to 0, indicating that a sequence number of a next packet that a receive end expects to receive is 0. In addition, each time the receive end receives a correct packet, the locally maintained packet sequence number is updated to (next_rcv_seq+1) % N. The following describes, by using an example in which the communication apparatus feeds back an ACK each time the communication apparatus receives four correct packets, a retransmission method shown in FIG. 12D.

At a moment T0, the transmit end sends a first packet, and the locally maintained sequence number is 0. When the receive end receives the first packet, and CRC information is successfully checked, the receive end updates next_rcv_seq to 1.

At a moment T1, the transmit end sends a first packet, and the locally maintained sequence number is 1. When the receive end receives the first packet, and CRC information is successfully checked, the receive end updates next_rcv_seq to 2.

At a moment T2, the transmit end sends a first packet, and the locally maintained sequence number is 2. When the receive end receives the first packet, and CRC information is successfully checked, the receive end updates next_rcv_seq to 3.

At a moment T3, the transmit end sends a first packet, and the locally maintained sequence number is 3. When the receive end receives the first packet, and CRC information is successfully checked, the receive end updates next_rcv_seq to 4. In addition, the receive end feeds back an ACK bit block, and a first sequence field in the ACK bit block carries 3, in other words, the first packet of the sequence number 3 and a first packet of a sequence number before the sequence number 3 are correctly received.

At a moment T4, the transmit end sends a first packet, and the locally maintained sequence number is 4. When the receive end receives the first packet, and CRC information is unsuccessfully checked, the receive end feeds back a NACK bit block. A first sequence field in the NACK bit block carries 3, indicating that the first packet of the sequence number 4 (and a first packet of a sequence number after the sequence number 4) are not correctly received.

At a moment T5, the transmit end sends a first packet, and the locally maintained sequence number is 5. When receiving the first packet, the receive end directly drops the first packet.

At a moment T6, the transmit end receives the NACK bit block sent by the transmit end.

At a moment T7, the transmit end sends three O bit blocks. A first type field of each O bit block carries 2b1, indicating that a retransmitted first packet is transmitted after the O bit block. In this case, provided that the receive end detects one correct O bit block, the receive end starts to update next_rcv_seq based on a correctly received packet.

At a moment T8, the transmit end sends a first packet, and the locally maintained sequence number is 4. When the receive end receives the first packet, and CRC information is successfully checked, the receive end updates next_rcv_seq to 5.

At a moment T9, the transmit end sends a first packet, and the locally maintained sequence number is 5. When the receive end receives the first packet, and CRC information is successfully checked, the receive end updates next_rcv_seq to 6.

Embodiment 7

In Embodiment 6 and Embodiment 7, a packet does not include a sequence number, so that overheads caused when the packet includes the sequence number can be effectively reduced. In addition, a packet start bit block of the packet does not include a sequence number, so that saved overheads can be further used to carry control information.

Further, Embodiment 6 shown above is shown by using an example in which a communication apparatus feeds back an ACK each time the communication apparatus receives four correct packets. However, to reduce overheads caused by frequently feeding back ACKs, in Embodiment 7, an example in which a communication apparatus feeds back an ACK each time the communication apparatus receives 1000 correct packets is used to describe a retransmission method, as shown in FIG. 12E. In other words, a quantity of correctly received packets for which feedback is performed in Embodiment 7 is greater than a quantity of correctly received packets for which feedback is performed in Embodiment 6. With reference to the foregoing method for feeding back an ACK bit block or a NACK bit block, a value of a preset quantity in Embodiment 7 is greater than a value of a preset quantity in Embodiment 6.

In addition, to avoid a case in which packets cannot be cleared from a replay buffer and buffer pressure of the replay buffer increases because an ACK bit block has not been received for a long time, in Embodiment 7, each time the communication apparatus receives one packet, timing is performed by using a timer. For example, timing time is preset duration. When the timing time is reached, the communication apparatus deletes a corresponding packet from the replay buffer. A specific value of the preset duration is not limited in this embodiment of this application.

For example, at a moment T0, a transmit end sends a packet of a sequence number 0, but the packet does not include the sequence number of the packet, and the timer is enabled. When the timing time of the timer is reached, and a NACK bit block is not received from a receive end, the transmit end may delete the packet of the sequence number 0 from the replay buffer.

For another example, at a moment T1000, the receive end receives a packet of a sequence number 1000, and the packet does not include the sequence number of the packet. If the receive end successfully checks the packet, the receive end sends three same ACK bit blocks to the transmit end. Therefore, after receiving the ACK bit block, the transmit end may clear the packet of the sequence number 1000 and a packet of a sequence number before the sequence number 1000 from the replay buffer.

For another example, at a moment T1001, the transmit end sends a packet of a sequence number 1001 to the receive end, and the packet does not include the sequence number of the packet. If the receive end does not correctly receive the packet, the receive end sends three same NACK bit blocks to the transmit end.

Figure 12D:
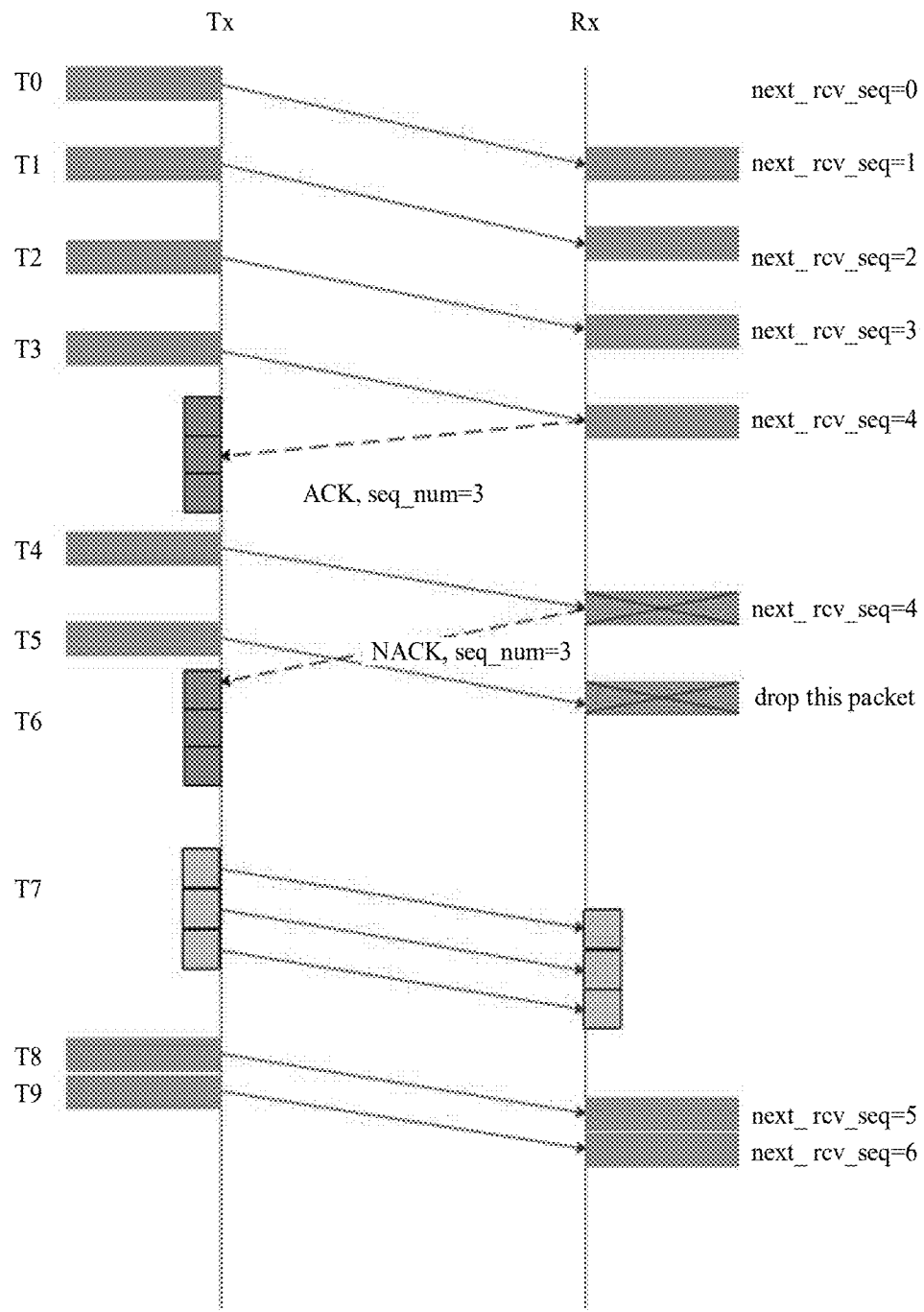
Figure 12E:
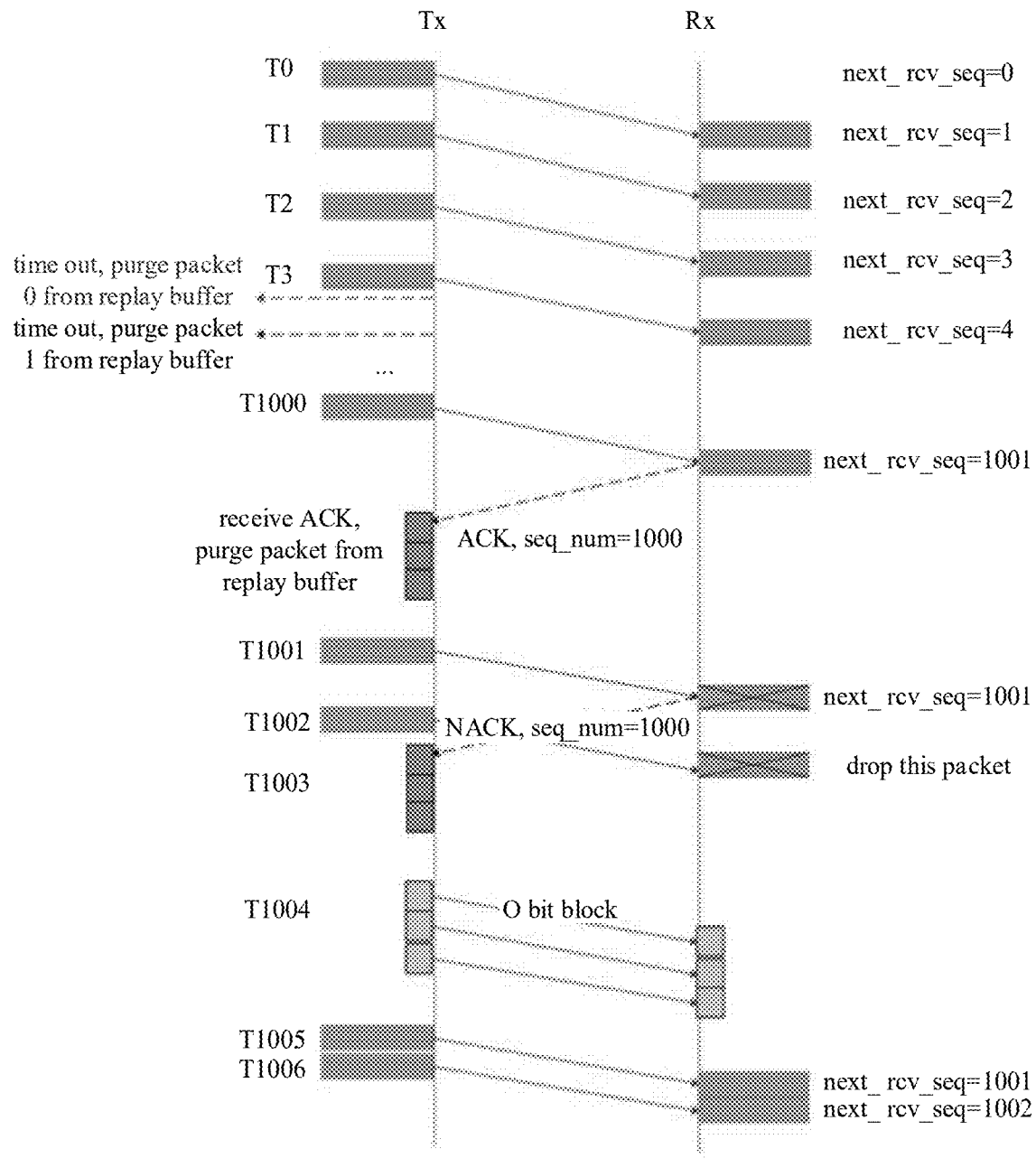

It may be understood that for specific descriptions of FIG. 12E, further refer to FIG. 12D. Details are not described herein again.

It may be understood that focuses of different embodiments shown in this application are different. For an implementation not described in detail in one embodiment, further refer to other embodiments. Details are not described herein again.

The following describes an apparatus provided in embodiments of this application.

Figure 13:
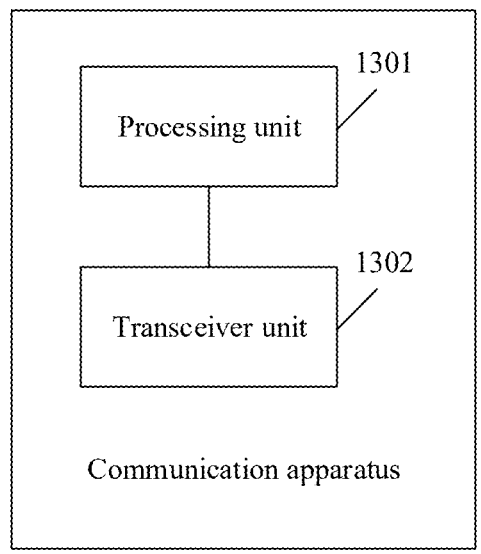
FIG. 13 is a schematic diagram of a structure of a communication apparatus according to an embodiment of this application.

FIG. 13 is a schematic diagram of a structure of a communication apparatus according to an embodiment of this application. The communication apparatus includes a processing unit 1301 and a transceiver unit 1302.

In some embodiments of this application, the communication apparatus shown in FIG. 13 may be configured to perform operations (functions, steps, or the like) performed by the receive end in the foregoing embodiments. For example, the communication apparatus may be configured to perform step 601 to step 604 shown in FIG. 6.

For example, the processing unit 1301 may be configured to generate at least one first bit block, and the transceiver unit 1302 is configured to send the at least one first bit block.

For another example, the transceiver unit 1302 may be further configured to send a second packet.

For another example, the transceiver unit 1302 may be further configured to receive at least one first packet.

For another example, the transceiver unit 1302 is specifically configured to send the at least one first bit block after sending a packet start bit block of the first packet and before completing sending the first packet.

For another example, the transceiver unit 1302 may be further configured to receive a retransmitted first packet.

In this embodiment of this application, for specific descriptions of the transceiver unit and the processing unit, further refer to steps performed by the receive end in the foregoing embodiments. Details are not described herein again. For example, the transceiver unit may be configured to perform the receiving step in step 601 shown in FIG. 6, or perform the sending steps in step 603 and step 604 shown in FIG. 6. For example, the transceiver unit may be further configured to perform the receiving steps in step 1201, step 1203, and step 1205 shown in FIG. 12B and the sending steps in step 1202, step 1204, and step 1206. For example, the transceiver unit may be further configured to perform the step of sending at least one O bit block shown in FIG. 8b and the step of sending a packet start bit block, a packet data bit block, and a packet end bit block shown in FIG. 8B.

In this embodiment of this application, for descriptions of the first bit block, a packet bit block, a non-packet bit block, the first packet, the second packet, or the like, refer to the foregoing embodiments. Details are not described herein again. For example, for a difference between the packet bit block and the non-packet bit block, refer to FIG. 4A to FIG. 4D, and for descriptions of the at least one first bit block, refer to FIG. 8A to FIG. 11B. It may be understood that the description is also applicable to the following embodiments, and details are not described below.

In other embodiments of this application, the communication apparatus shown in FIG. 13 may be configured to perform operations (functions, steps, or the like) performed by the transmit end in the foregoing embodiments. For example, the communication apparatus may be configured to perform step 601 and step 603 to step 607 shown in FIG. 6.

For example, the transceiver unit 1302 is configured to receive at least one first bit block, and the processing unit 1301 is configured to determine, based on the at least one first bit block, whether to retransmit at least one first bit block corresponding to first sequence information.

For another example, the transceiver unit 1302 may be further configured to send the at least one first packet.

For another example, the transceiver unit 1302 may be further configured to send the at least one incorrectly received first packet corresponding to the first sequence information.

For another example, the processing unit 1301 is further configured to perform CRC check on the at least one first bit block.

In this embodiment of this application, the processing unit may perform CRC check on the at least one first bit block in different manners depending on whether the at least one first bit block is a non-packet bit block or a packet bit block. For example, if the at least one first bit block is a non-packet bit block, the processing unit may check CRC information carried in a CRC field in the at least one first bit block; or if the at least one first bit block is a packet bit block, the processing unit may not only check CRC information carried in a CRC field in the at least one first bit block, but also check CRC information carried in another CRC field (for example, an FCS field) of the first packet.

The descriptions of the transceiver unit and the processing unit shown in embodiments of this application are merely examples. For specific implementations of the transceiver unit and the processing unit, refer to steps performed by the receive end in the foregoing embodiments. Details are not described herein again. For example, the transceiver unit may be configured to perform the sending step in step 601 shown in FIG. 6, or perform the receiving steps in step 603 and step 604 shown in FIG. 6. For example, the transceiver unit may be further configured to perform the sending steps in step 1201, step 1203, and step 1205 shown in FIG. 12B and the receiving steps in step 1202, step 1204, and step 1206. For example, the transceiver unit may be further configured to perform the step of receiving at least one O bit block shown in FIG. 8B and the step of receiving a packet start bit block, a packet data bit block, and a packet end bit block shown in FIG. 8B.

Division into the modules in embodiments of this application is an example, is merely division into logical functions, and may be other division during actual implementation. In addition, functional modules or units in embodiments of this application may be integrated into one processor, or each of the modules or units may exist alone physically, or two or more modules or units may be integrated into one module or unit. The integrated module or unit may be implemented in a form of hardware, or may be implemented in a form of a software functional module.

In a possible implementation, when the communication apparatus shown in FIG. 13 is any form of computer, server, switch, router, network adapter, or the like, an apparatus in any form of computer, server, switch, router, network adapter, or the like, or an apparatus used together with any form of computer, server, switch, router, network adapter, or the like, the processing unit 1301 may be one or more processors, the transceiver unit 1302 may be a transceiver, or the transceiver unit 1302 may be a sending unit and a receiving unit. The sending unit may be a transmitter, the receiving unit may be a receiver, and the sending unit and the receiving unit are integrated into one component, for example, a transceiver. In this embodiment of this application, the processor and the transceiver may be coupled or the like. A connection manner between the processor and the transceiver is not limited in this embodiment of this application.

Figure 14:
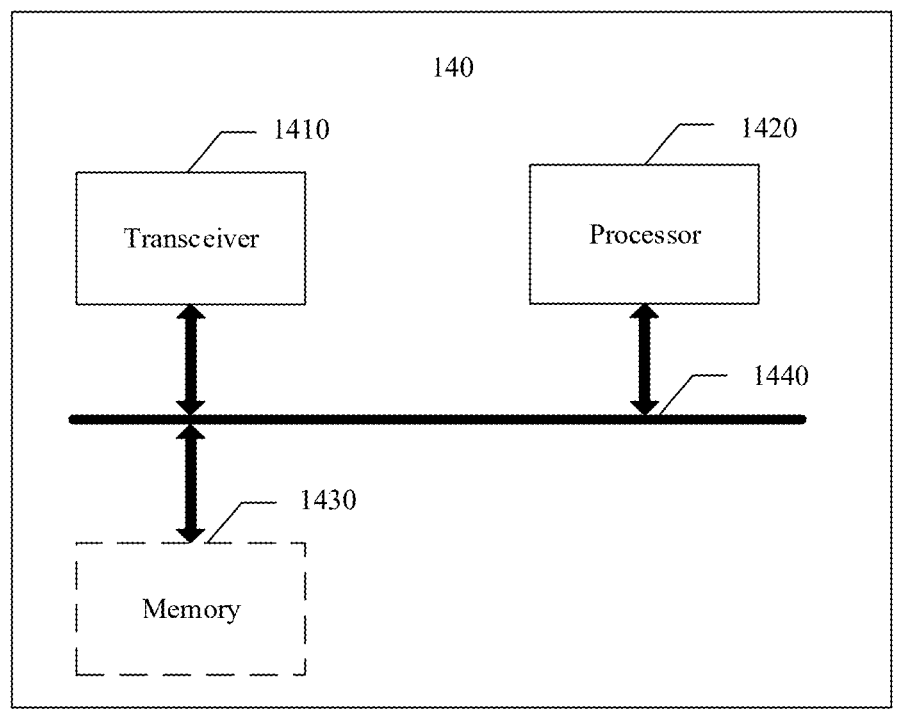
FIG. 14 is a schematic diagram of a structure of another communication apparatus according to an embodiment of this application.

As shown in FIG. 14, a communication apparatus 140 includes one or more processors 1420 and transceivers 1410.

Optionally, the processor and the transceiver may be configured to perform functions, operations, or the like performed when the communication apparatus is used as a receive end. For example, the processor is configured to generate at least one first bit block, and the transceiver is configured to send the at least one first bit block. For another example, the transceiver is configured to receive a first packet. For another example, the transceiver is configured to send the at least one first bit block after sending a packet start bit block of a second packet and before completing sending the second packet. For another example, the transceiver is further configured to send the second packet. It may be understood that the descriptions of the processor and the transceiver shown herein are merely examples.

Optionally, the processor and the transceiver may be configured to perform functions, operations, or the like performed when the communication apparatus is used as a transmit end. For example, the transceiver is configured to receive at least one first bit block, and the processor is configured to determine, based on the at least one first bit block, whether to retransmit at least one first packet corresponding to first sequence information. For another example, the transceiver is further configured to send the first packet. For another example, the transceiver is further configured to retransmit at least one incorrectly received first packet. For another example, the processor is further configured to perform CRC check on the at least one first bit block.

It may be understood that for functions, operations, or the like performed by the transceiver and/or the processor, refer to the embodiments shown in FIG. 13, or further refer to the method embodiment shown in FIG. 6 or the like. Details are not described herein again.

In various implementations of the communication apparatus shown in FIG. 14, the transceiver may include a receiver and a transmitter, the receiver is configured to perform a receiving function (or operation), and the transmitter is configured to perform a transmitting function (or operation). The transceiver is configured to communicate with another device/apparatus by using a transmission medium.

Optionally, the communication apparatus 140 may further include one or more memories 1430, configured to store program instructions and/or data. The memory 1430 is coupled to the processor 1420. The coupling in this embodiment of this application is indirect coupling or a communication connection between apparatuses, units, or modules for information exchange between the apparatuses, the units, or the modules, and may be in electrical, mechanical, or other forms. The processor 1420 may perform an operation in cooperation with the memory 1430. The processor 1420 may execute the program instructions stored in the memory 1430. Optionally, at least one of the one or more memories may be included in the processor.

In this embodiment of this application, a specific connection medium between the transceiver 1410, the processor 1420, and the memory 1430 is not limited. In this embodiment of this application, the memory 1430, the processor 1420, and the transceiver 1410 are connected by using a bus 1440 in FIG. 14. The bus is represented by using a bold line in FIG. 14. A manner of connection between other components is merely an example for description, and imposes no limitation. The bus may be classified into an address bus, a data bus, a control bus, and the like. For ease of representation, only one bold line is used for representation in FIG. 14, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In this embodiment of this application, the memory may include but is not limited to a non-volatile memory such as a hard disk drive (HDD) or a solid-state drive (SSD), a random-access memory (RAM), an erasable programmable read-only memory (EPROM), a read-only memory (ROM), a compact disc read-only memory (CD-ROM), or the like. The memory is any storage medium that can be used to carry or store program code in a form of an instruction or a data structure and that can be read and/or written by a computer (for example, the communication apparatus shown in this application), but is not limited thereto. The memory in this embodiment of this application may alternatively be a circuit or any other apparatus that can implement a storage function, and is configured to store program instructions and/or data.

It may be understood that the communication apparatus shown in this embodiment of this application may alternatively include more components or the like than those shown in FIG. 14. This is not limited in this embodiment of this application.

It may be understood that the foregoing method performed by the processor and the transceiver is merely an example. For specific steps performed by the processor and the transceiver, refer to the method described above.

In another possible implementation, when the foregoing communication apparatus is a chip system such as a server, an access device, a switch, a router, or a network adapter, the processing unit 1301 may be one or more logic circuits, and the transceiver unit 1302 may be an input/output interface, which is also referred to as a communication interface, an interface circuit, an interface, or the like. Alternatively, the transceiver unit 1302 may be a sending unit and a receiving unit. The sending unit may be an output interface, the receiving unit may be an input interface, and the sending unit and the receiving unit are integrated into one unit, for example, an input/output interface.

The logic circuit 1501 may be a chip, a processing circuit, an integrated circuit, a system on chip (SoC) chip, or the like, and the interface 1502 may be a communication interface, an input/output interface, or the like. In this embodiment of this application, the logic circuit and the interface may be further coupled to each other. A specific connection manner between the logic circuit and the interface is not limited in this embodiment of this application.

Figure 15:
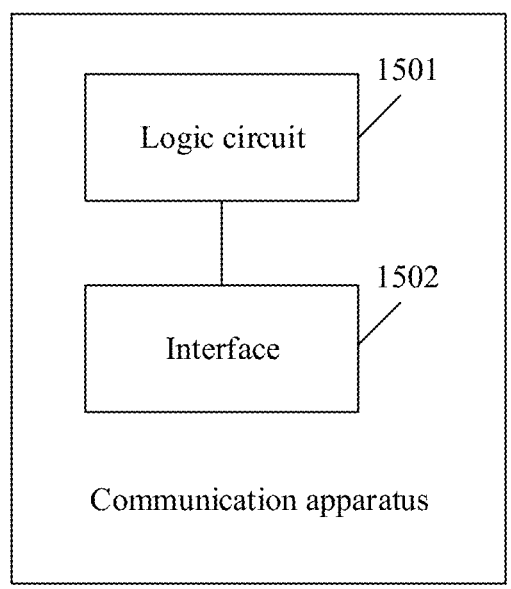
FIG. 15 is a schematic diagram of a structure of still another communication apparatus according to an embodiment of this application.

As shown in FIG. 15, a communication apparatus shown in FIG. 15 includes a logic circuit 1501 and an interface 1502. To be specific, the foregoing processing unit 1301 may be implemented by the logic circuit 1501, and the foregoing transceiver unit 1302 may be implemented by the interface 1502.

Optionally, the logic circuit and the interface may be configured to perform functions, operations, or the like performed when the communication apparatus is used as a receive end. For example, the logic circuit is configured to generate at least one first bit block, and the interface is configured to output the at least one first bit block. For another example, the interface is configured to output a second packet. For another example, the interface is configured to output the at least one first bit block after outputting a packet start bit block of the second packet and before completing outputting the second packet. For another example, the interface is further configured to input a first packet.

Optionally, the logic circuit and the interface may be configured to perform functions, operations, or the like performed when the communication apparatus is used as a transmit end. For example, the interface is configured to input at least one first bit block, and the logic circuit is configured to determine, based on the at least one first bit block, whether to retransmit at least one first packet corresponding to first sequence information. For another example, the interface is further configured to output the first packet. For another example, the logic circuit is further configured to perform CRC check on the at least one first bit block.

It may be understood that for functions, operations, or the like performed by the interface and/or the logic circuit, refer to the embodiments shown in FIG. 13, or further refer to the method embodiment shown in FIG. 6 or the like. Details are not described herein again.

In addition, this application further provides a computer program. The computer program is used to implement operations and/or processing performed by a receive end in the method provided in this application.

This application further provides a computer program. The computer program is used to implement operations and/or processing performed by a transmit end in the method provided in this application.

This application further provides a computer-readable storage medium. The computer-readable storage medium stores computer code, and when the computer code is run on a computer, the computer is enabled to perform operations and/or processing performed by a receive end in the method provided in this application.

This application further provides a computer-readable storage medium. The computer-readable storage medium stores computer code, and when the computer code is run on a computer, the computer is enabled to perform operations and/or processing performed by a transmit end in the method provided in this application.

This application further provides a computer program product. The computer program product includes computer code or a computer program, and when the computer code or the computer program is run on a computer, operations and/or processing performed by a receive end in the method provided in this application are or is performed.

This application further provides a computer program product. The computer program product includes computer code or a computer program, and when the computer code or the computer program is run on a computer, operations and/or processing performed by a transmit end in the method provided in this application are or is performed.

An embodiment of this application further provides a communication system. The communication system includes a transmit end and a receive end. The receive end may be configured to perform step 601 (receiving step), step 602, step 603 (sending step), step 604 (sending step), or the like shown in FIG. 6. The transmit end may be configured to perform step 601 (sending step), step 605, step 606, step 607 (sending step), or the like shown in FIG. 6. It may be understood that the steps performed by the transmit end and the receive end shown herein are merely examples. For other steps performed by the receive end and the transmit end, further refer to the foregoing embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the technical effects of the solutions provided in embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   receiving, at a receive end, a frame from a transmit end; and
   sending a first 64B/66B block to indicate the frame is correctly received, wherein the first 64B/66B block is an ordered set (O) bit block, wherein a value of a block type field of the first 64B/66B block is 0x4B, and wherein the first 64B/66B block comprises a first sequence number corresponding to the frame.

2. The method of claim 1, wherein the first 64B/66B block is at least one of a non-frame start bit block, a first data bit block corresponding to the non-frame start bit block, an end bit block corresponding to the non-frame start bit block, a non-frame end bit block, a start bit block corresponding to the non-frame end bit block, or a second data bit block corresponding to the non-frame end bit block.

3. The method of claim 1, further comprising sending a second frame comprising a frame bit block.

4. The method of claim 3, further comprising sending the first 64B/66B block after a frame start bit block of the second frame has sent and before sending of the second frame has completed.

5. The method of claim 4, wherein the frame start bit block comprises a first field carrying a first value.

6. The method of claim 5, wherein the frame start bit block further comprises a first sequence field carrying first sequence information.

7. The method of claim 6, wherein the frame start bit block further comprises a first type field, and wherein the first type field indicates that the first sequence information is a second sequence number of the second frame when the first type field carries a third value.

8. The method of claim 1, wherein the first 64B/66B block further comprises a second type field indicating a type of the first 64B/66B block, and wherein the type comprises an acknowledgment (ACK) or a negative acknowledgment (NACK).

9. The method of claim 8, wherein the second type field is in a D1 area of the first 64B/66B block.

10. The method of claim 9, wherein the first sequence number follows immediately after the second type field.

11. The method of claim 1, wherein the first 64B/66B block further comprises:
   a first data bit block corresponding to a non-frame start bit block;
   a first end bit block corresponding to the non-frame start bit block; or
   a second data bit block corresponding to the non-frame start bit block and a second end bit block corresponding to the non-frame start bit block.

12. The method of claim 11, wherein when the first 64B/66B block comprises the non-frame start bit block and the first end bit block corresponding to the non-frame start bit block, sending the first 64B/66B block comprises:
   sequentially sending the non-frame start bit block and the first end bit block corresponding to the non-frame start bit block; or
   sequentially sending the first end bit block corresponding to the non-frame start bit block and the non-frame start bit block.

13. The method of claim 1, wherein the first 64B/66B block further comprises a cyclic redundancy check (CRC) field.

14. The method of claim 1, wherein the 64B/66B block comprises a payload bit quantity of 64 bits, a total bit quantity of 66 bits, and a synchronization header bit quantity of 2 bits.

15. The method of claim 1, wherein the O bit block comprises a second field carrying a second value, and wherein the second value is 0x06.

16. The method of claim 1, wherein the first sequence number corresponds to the last correctly received frame.

17. The method of claim 16, wherein the last correctly received frame is defined by using a frame check sequence (FCS) in the received frame.

18. The method of claim 1, wherein the block type field comprises 8 bits at bit positions 2 to 9 of the first 64B/66B block.

19. An apparatus comprising:
   a memory configured to store instructions; and
   one or more processors coupled to the memory and configured to execute the instructions to:
      receive, at a receive end, a frame from a transmit end; and
      send a first 64B/66B block to indicate the frame is correctly received, wherein the first 64B/66B block is an ordered set (O) bit block, wherein a value of a block type field of the first 64B/66B block is 0x4B, and wherein the first 64B/66B block comprises a first sequence number corresponding to the frame.

20. The apparatus of claim 19, wherein the one or more processors is further configured to execute the instructions to send a second frame comprising a frame bit block.

21. The apparatus of claim 19, wherein the O bit block comprises a second field carrying a second value, and wherein the second value is 0x06.

22. The apparatus of claim 19, wherein the first sequence number is corresponding to the last correctly received frame.

23. The apparatus of claim 22, wherein the last correctly received frame is defined by using a frame check sequence (FCS) in the received frame.

24. The apparatus of claim 19, wherein the block type field comprises 8 bits at bit positions 2 to 9 of the first 64B/66B block.

25. The apparatus of claim 19, wherein the first 64B/66B block further comprises a second type field indicating a type of the first 64B/66B block, wherein the type comprises an acknowledgment (ACK) or a negative acknowledgment (NACK), and wherein the second type field is in a D1 area of the first 64B/66B block.

26. The apparatus of claim 25, wherein the first sequence number follows immediately after the second type field.

27. A computer program product comprising computer-executable instructions for storage on a non-transitory computer-readable storage medium that, when executed by one or more processors, cause an apparatus to:
   receive a frame from a transmit end; and
   send a first 64B/66B block to indicate the frame is correctly received, wherein the first 64B/66B block is an ordered set (O) block, wherein a value of a block type field of the first 64B/66B block is 0x4B, and wherein the first 64B/66B block comprises a first sequence number corresponding to the frame.

\* \* \* \* \*

UNITED STATES PATENT AND TRADEMARK OFFICE
CERTIFICATE OF CORRECTION

PATENT NO. : 12,470,321 B2  
APPLICATION NO. : 18/161605  
DATED : November 11, 2025  
INVENTOR(S) : Desheng Sun, Li Ding and Chunsheng Yang Page 1 of 1

It is certified that error appears in the above-identified patent and that said Letters Patent is hereby corrected as shown below:

In the Claims

Claim 22, Column 48, Line 16: "number is corresponding to" should read "number corresponds to"

Signed and Sealed this  
Twenty-third Day of December, 2025

John A. Squires  
*Director of the United States Patent and Trademark Office*